US009052908B2

(12) United States Patent
Fu et al.

(10) Patent No.: US 9,052,908 B2
(45) Date of Patent: Jun. 9, 2015

(54) WEB APPLICATION DEVELOPMENT FRAMEWORK

(75) Inventors: Yupeng Fu, La Jolla, CA (US); Kian Win Ong, San Diego, CA (US); Yannis Papakonstantinou, La Jolla, CA (US); Keliang Zhao, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 790 days.

(21) Appl. No.: 13/012,787

(22) Filed: Jan. 24, 2011

(65) Prior Publication Data
US 2011/0191407 A1 Aug. 4, 2011

Related U.S. Application Data

(60) Provisional application No. 61/297,663, filed on Jan. 22, 2010, provisional application No. 61/423,969, filed on Dec. 16, 2010.

(51) Int. Cl.
G06F 15/16 (2006.01)
G06F 9/44 (2006.01)

(52) U.S. Cl.
CPC .................................. G06F 8/38 (2013.01)

(58) Field of Classification Search
CPC ............................................... G06F 8/38
USPC .................... 709/203, 212, 213, 219, 246
See application file for complete search history.

(56) References Cited

U.S. PATENT DOCUMENTS

| 7,770,059 | B1* | 8/2010 | Glade et al. ............... 714/6.32 |
| 2004/0083204 | A1 | 4/2004 | Dettinger et al. |
| 2004/0148270 | A1 | 7/2004 | McKay et al. |
| 2005/0080766 | A1 | 4/2005 | Ghatare |
| 2005/0086664 | A1* | 4/2005 | Sundaresan et al. .......... 719/312 |
| 2007/0083533 | A1* | 4/2007 | Mirkazemi et al. ........... 707/100 |
| 2007/0226339 | A1 | 9/2007 | Suen et al. |
| 2012/0011431 | A1* | 1/2012 | Mao ............................. 715/234 |
| 2014/0280486 | A1* | 9/2014 | Seay, Gordon E. ........... 709/203 |

OTHER PUBLICATIONS

J. Ponzo et al. "On demand Web-client technologies", IBM Systems Journal, vol. 43, No. 2, 2004.*

(Continued)

*Primary Examiner* — Michael Y Won
(74) *Attorney, Agent, or Firm* — Perkins Coie LLP

(57) ABSTRACT

Techniques, systems, apparatus and computer-program products are disclosed for developing a web-hosted shared database system with improved user interface and reduced programming. In one aspect, using a web application development framework includes declaratively specifying a web application's pages using page configurations. The framework can automatically coordinate page state with the state of a database server and an applications server, so that the specified page is first rendered and then one or more portions of the page can be updated in response to a server data change. Also, programs that are executed when a request is issued are declaratively specified using program configurations. Either or both of the page configurations and the program configurations can be implemented by access to a unified application state virtual database. Further, the unified application state virtual database can include the persistent database of the application and transient memory-based data, such as session and page data.

20 Claims, 19 Drawing Sheets

(56) References Cited

OTHER PUBLICATIONS

A. Ankolekar et al. "The Two Cultures. Mashing up Web 2.0 and the Semantic Web", WWW 2007, May 8-12, 2007, Banff, Alberta, Canada.*

Akutsu, T., et al., "Approximating Tree Edit Distance Through String Edit Distance," Proceedings of the 17th Annual International Symposium on Algorithms and Computation (ISAAC'06), vol. 4288, pp. 90-99, (2006).

Ali, M.A., et al., "MOVIE: An incremental maintenance system for materialized object views," Data & Knowledge Engineering, 47(2):131-166, Nov. 2003.

Bancilhon, F., et al., "A Query Language for the O2 Object-Oriented Database System," Proceedings of the Second International Workshop on Database Programming Languages, pp. 122-138, Jun. 1989.

Bille, P., "A Survey on Tree Edit Distance and Related Problems," Theoretical Computer Science, 337(1-3):217-239, Jun. 2005.

Cobena, G., et al., "Detecting changes in XML documents," 18th International Conference on Data Engineering (ICDE'02), pp. 41-52, Feb. 2002.

Colby, L.S., et al., "Algorithms for Deferred View Maintenance," Proceedings of the 1996 ACM SIGMOD International Conference on Management of Data, pp. 469-480, Jun. 1996.

Demaine, E.D., et al., "An optimal decomposition algorithm for tree edit distance," Lecture Notes in Computer Science—Proceedings of ICALP, vol. 4596, pp. 146-157, (2007).

Dimitrova, K., et al., "Order-Sensitive View Maintenance of Materialized XQuery Views," International Conference on Conceptual Modeling, vol. 2813, pp. 144-157, Oct. 2003.

Foster, J.N., et al., "An Algebraic Approach to XQuery View Maintenance," ACM SIGPLAN Workshop on Programming Language Technologies for XML (PLAN-X), 11 pages, Jan. 2008.

Fourny, G., et al., "XQuery in the Browser," WWW, pp. 1011-1020, Apr. 2009.

Fu, Y., et al., "Ajax-based Report Pages as Incrementally Rendered Views," SIGMOD'10, pp. 567-578, Jun. 2010.

Fu, Y., et al., "The SQL-based All-Declarative FORWARD Web Application Development Framework," 5th Biennial Conference on Innovative Data Systems Research (CIDR '11), pp. 69-78, Jan. 2011.

Garrett, J.J., "Ajax: a New Approach to Web Applications," http://www.adaptivepath.com/ideas/essays/archives/000385.php, 5 pages, Feb. 2005.

Griffin, T., et al., "Incremental Maintenance of Views with Duplicates," ACM SIGMOD Record, 24(2):328-339, May 1995.

Gupta, A., et al., "Maintaining Views Incrementally," ACM SIGMOD Record, 22(2):157-166, Jun. 1993.

Gupta, A., et al., "Maintenance of Materialized Views: Problems, Techniques, and Applications," IEEE Data Engineering Bulletin, 18(2):3-18, Jun. 1995.

Habib, M.A., et al., "Analysis of Sources of Latency in Downloading Web Pages," WebNet, 19 pages, (2000).

Johnson, B., "Reveling in Constraints," ACM Queue, 7(6):30-37, Jul. 2009.

Krasner, G.E., et al., "A Cookbook for Using the Model-View Controller User Interface Paradigm in Smalltalk-80," Journal of Object-Oriented Programming, 1(3):26-49, Aug./Sep. 1988.

O'Hanlon, C., "A Conversation with Werner Vogels," ACM Queue, 4(4):14-22, Jun. 2006.

Ross, K.A., et al., "Materialized View Maintenance and Integrity Constraint Checking: Trading Space for Time," ACM SIGMOD Record, 25(2):447-458, Jun. 1996.

Yang, F., et al., "A Unified Platform for Data Driven Web Applications with Automatic Client-Server Partitioning," Proceedings of the 16th International Conference on World Wide Web, pp. 341-350, May 2007.

Yang, F., et al., "Hilda: A High-Level Language for Data-Driven Web Applications," 22nd International Conference on Data Engineering (ICDE'06), 12 pages, Apr. 2006.

Yi, K., et al., "Efficient Maintenance of Materialized Top-k Views," Proceedings 19th International Conference on Data Engineering (ICDE'03), pp. 1-26, Mar. 2003.

International Search Report and Written Opinion mailed on Sep. 26, 2011 for International Application No. PCT/US2011/022302, filed Jan. 24, 2011 (7 pages).

* cited by examiner

```
501  list(
502    tuple(
503      proposal_id  : 509 ,
504      title        : Flying Cars,
505      average_grade: 4.5,
506      reviews        :set(
507        tuple(
508          review_id :  1,
509          comment   :  Creative...,
510          grade     :  3 - Good,
511          reviewer  :  tom@abc.edu)
512          ...),
```

505 → line 502 (tuple)
510 → line 504 (title)

FIG. 5A

```
513    grades        :  list(
514      tuple(
515        bar_id :  1,
516        value  :  3)),
517    my_review   :  switch(
518      input_tuple: tuple(
519        comment : null,
520        grade   : tuple(
521          grade_ref     : null,
522          grade_options:list(
523            tuple(
524              grade_id   : 1,
525              grade_label: 1 - Poor)
526              ...)))
527        ))
528    ...)
```

515 → line 516 (value)

FIG. 5B

```
601  list(
602    tuple(
603      proposal_id   : int,
604      title         : string,
605      average_grade : float,
606      reviews       : set(
607        tuple(
608          review_id : int,
609          comment   : string,
610          grade     : string,
611          reviewer  : string)
612        ),
```

FIG. 6A

```
613      grades        : list(
614        tuple(
615          bar_id : int,
616          value  : int)),
617      my_review     : switch(
618   input_tuple: tuple(
619        comment : string,
620        grade   : tuple(
621          grade_ref     :int,
622          grade_options:list(
623            tuple(
624              grade_id    :int,
625              grade_label:string)
626          )),
627   display_tuple : tuple(
628        comment : string
629        grade   : string
630      )))
631  )
```

FIG. 6B

```
701  SELECT  P.proposal_id, P.title,    705
702    (
703      SELECT    *
704      FROM      reviews R
705      WHERE     R.proposal_ref = P.proposal_id
706      AND       R.reviewer <> S.user
707    ) AS other_reviews,
708    (
709      SELECT    R.review_id AS bar_id, R.grade AS value
710      FROM      reviews R
711 715 WHERE     R.proposal_ref = P.proposal_id
712      ORDER BY  R.grade DESC
713    ) AS grades,
```

FIG. 7A

```
714    (                                           720
715      SELECT   CASE
716        WHEN (D.mode = `input') THEN `input_tuple' :
717          SELECT
718            D.comment, Tuple(
719              D.grade_ref,
720              ( SELECT * FROM grade_options )
721              AS grade_options
722            ) AS grade
723        ELSE `display_tuple' :
724          SELECT   R.comment, R.grade
725          FROM     reviews R
726          WHERE    R.proposal_ref = P.proposal_id
727          AND      R.reviewer = S.user
728      END
729      FROM    draft_reviews D
730      WHERE   D.proposal_ref = P.proposal_id
731      AND     D.reviewer = S.user
732    ) AS my_review,
```

FIG. 7B

```
733                                              ┌725
734      (
735         SELECT   AVG(R.grade)
736         FROM     reviews R
737         WHERE    R.proposal_ref = P.proposal_id
738      ) AS average_grade
739                                              ┌730
740   FROM  proposals P, current_session S
741   WHERE EXISTS (
742      SELECT   *
743      FROM     assignments A
744      WHERE    A.proposal_ref = P.proposal_id
745      AND      A.reviewer = S.user
746   )
747   ORDER BY P.proposal_id
```

```
801 <html:html>
802 <html:h1>List of all proposals.</html:h1>
803 <unit:table bind="page_state">
804     <column header="Title">
805         <unit:print bind="title" />
806     </column>
807     <column header="Other reviews">
808         <unit:table bind="other_reviews">
809             <column header="Comment">
810                 <unit:print bind="comment" />
811             </column>
812             <column header="Grade">
813                 <unit:print bind="grade" />
814             </column>
815             <column header="Reviewer">
816                 <unit:print bind="reviewer_id" />
817             </column>
818         </unit:table>
819     </column>
820     <column header="grades">
821         <unit:barchart bind="grades" />
822     </column>
823     <column header="My Review">
824         <unit:switch bind="my_review">
825             <case bind="input_tuple">
826                 <html:div>
827         805⤴    <unit:dropdown bind="grade">
828                     <ref bind="grade_ref" />
```

FIG. 8A

```
829                    <options bind="grade_options">
830                         <option bind="grade_option" />
831                    </options>
832                 </unit:dropdown>
833                 <unit:textbox bind="comment" />
834                 <unit:button text="Submit"
835                   on_click="save_review"/>
836              </html:div>
837           </case>
838           <case bind="display_tuple">
839              <html:div>
840                 Comment:
841                 <unit:print bind="comment" />
842                 Grade:
843                 <unit:print bind="grade" />
844                 <unit:button text="Edit"
845                   on_click="edit_review" />
846                 <unit:button text="Remove"
847                   on_click="remove_review" />
848              </html:div>
849           </case>
850        </unit:switch>
851     </column>
852     <column header="Avg. Grade">
853        <unit:print bind="average_grade" />
854     </column>
855  </unit:table>
856 </html:html>
```

FIG. 8B

```
901   CREATE VIEW T1_proposals AS
902   SELECT    R.proposal_id, P.title, S.user
903   FROM      proposals P, current_session S
904   WHERE     EXISTS (
905       SELECT   *
906       FROM     assignments A
907       WHERE    A.proposal_ref = P.proposal_id
908       AND      A.reviewer = S.user
909   )
910   ORDER BY P.proposal_id
911
912   CREATE VIEW T2_other_reviews AS
913   SELECT    R.comment, R.grade, R.review_id,
914   T1.proposal_id
915   FROM      reviews R, T1_proposals T1
916   WHERE     R.proposal_ref = T1.proposal_id
917   AND       R.reviewer <> T1.user
918
919   CREATE VIEW T3_average_grade AS
920   SELECT    T1.proposal_id, AVG(R.grade)
921   FROM      reviews R, T1_proposals T1
922   WHERE     R.proposal_ref = T1.proposal_id
923   GROUP BY T1.proposal_id
```

FIG. 9

```
1401  <?xml version="1.0" encoding="UTF-8"?>
1402    <html xmlns:funit="http://forward.ucsd.edu/units"
1403        xmlns:fstmt="http://forward.ucsd.edu/statements">
1404
1405    <!-- Omitted: CSS, images, headers etc. -->
1406    <funit:table>
1407        <th>
1408            <td>ID</td>
1409            <td>Title</td>
1410            <!-- Omitted: Rest of the headers -->
1411        </th>
1412        <fstmt:for name="proposals"
1413            query="{SELECT id AS proposal_id, title, pdf_link
1414                    FROM db.proposals
1415                    ORDER BY proposal_id}">
1416            <tr>
1417                <td>{proposal_id}</td>
1418                <td><a href="{pdf_link}">{title}</a></td>
1419
1420                <td>
1421                    <!-- Table showing others' reviews -->
1422                    <funit:table>
1423                        <fstmt:for
1424                            query="{SELECT comment, grade, reviewer
1425                                    FROM db.reviews
1426                                    WHERE reviewer <> session.user
1427                                    AND proposal = proposal_id}">
1428                            <tr>
1429                                <td>{comment}</td>
1430                                <td>{grade}</td>
1431                                <td>{reviewer}</td>
1432                            </tr>
1433                        </fstmt:for>
1434                    </funit:table>
1435                </td>
1436                <td>
1437                    <!-- Bar chart showing grades -->
1438                    <funit:bar_chart>
1439                        <fstmt:for
1440                            query="{SELECT grade
1441                                    FROM db.reviews
1442                                    WHERE proposal = proposal_id
1443                                    ORDER BY grade DESC}">
1444                            <bar bar_value="{grade}" />
1445                        </fstmt:for>
1446                    </funit:bar_chart>
1447                </td>
```

FIG. 14A

```
1448
1449            <td>
1450                <fstmt:switch>
1451
1452                    <!-- Existing review -->
1453                    <fstmt:case condition="{EXISTS (
1454                        SELECT * FROM db.reviews
1455                        WHERE reviewer = session.user
1456                        AND proposal = proposal_id)}">
1457                      Comment:  { SELECT comment FROM db.reviews
1458                                  WHERE reviewer = session.user
1459                                  AND proposal = proposal_id}
1460                      <br />
1461                      Grade:    { SELECT grade FROM db.reviews
1462                                  WHERE reviewer = session.user
1463                                  AND proposal = proposal_id}
1464                      <funit:button onclick="edit_review">Edit</funit:button>
1465                      <funit:button onclick="remove_review">Remove</funit:button>
1466                    </fstmt:case>
1467                    <!-- New review -->
1468                    <fstmt:else>
1469                      <funit:textbox name="review"/>
1470                      <funit:dropdown name="grade">
1471                        <options>
1472                          <option>1 - Poor</option>
1473                          <option>2 - Fair</option>
1474                          <option>3 - Good</option>
1475                          <option>4 - Very Good</option>
1476                          <option>5 - Excellent</option>
1477                        </options>
1478                      </funit:dropdown>
1479                      <funit:button onclick="save_review">Submit</funit:button>
1480                    </fstmt:else>
1481                </fstmt:switch>
1482            </td>
1483
1484            <td>
1485                <!-- Average grade -->
1486                {SELECT AVG(grade) as average_grade
1487                    FROM db.reviews
1488                    WHERE proposal = proposal_id}
1489            </td>
1490        </tr>
1491    </fstmt:for>
1492 </funit:table>
1493 </html>
```

FIG. 14B

WEB APPLICATION DEVELOPMENT FRAMEWORK

CROSS REFERENCE TO RELATED APPLICATIONS

This application claims the benefit of U.S. Provisional Patent Application Ser. No. 61/423,969 entitled SQL-BASED ALL-DECLARATIVE FORWARD WEB APPLICATION DEVELOPMENT FRAMEWORK, filed on Dec. 16, 2010, and U.S. Provisional Patent Application Ser. No. 61/297,663 entitled DATABASE DRIVEN AJAX APPLICATIONS, filed on Jan. 22, 2010, the disclosures of which are incorporated in their entirety herein by reference.

STATEMENT REGARDING FEDERALLY SPONSORED RESEARCH OR DEVELOPMENT

This invention was made with government support under Grant Nos. 0917379 and 1018961 awarded by the National Science Foundation. The government has certain rights in the invention.

BACKGROUND

This disclosure relates to devices, techniques, and systems pertaining to databases containing computer-readable data. More particularly, this disclosure concerns computer-implemented systems configured to facilitate the development and maintenance of database driven applications, where an interface is executed by a client device, such as a desktop or a mobile device.

Database-driven web applications typically are configured to perform simple interactions with a database server and an application server. In particular, the database-driven web application executes an action, in response to user input at the browser, which issues one or more commands to the database server to perform one or more actions. The one or more actions can be inserting, deleting, or updating records of the database. Additional commands can modify data maintained by the application server. Further, the action can determine the next page to be displayed in response to an evaluation of one or more simple conditions.

Despite their apparent simplicity, basic web applications can take a significant amount of time to develop because the code must be developed to resolve system integration and data coordination issues across multiple systems. The systems can include (a) the database server, (b) the application server, and (c) the client device (e.g., a smart phone) for user interaction. Further, one or more layers, such as the visual layer, the application logic layer, and the data layer, can use a different language. In such an instance, communications between layers must be translated.

In some web applications, Ajax has been used to update pages using event driven code. As a result, an event handling function can be executed to collect data relevant to an action. A response handler can receive the result of the event and use it to partially update a page. However, using Ajax to permit partial updates also can require a significant amount of development. For instance, it can be necessary to generate code for each action that partially updates a page. Further, it can be necessary to generate server-side code to retrieve data needed for a page update and browser-side code to render a sub-region of the page that has changed.

SUMMARY

Techniques, structures, apparatus and systems are disclosed for developing web-hosted, shared database systems with a more user friendly, less error-prone programming framework. The framework can be implemented to provide design facilities and a platform to permit the development of database-driven web applications.

Ajax web application implementation can be performed using a declarative approach. Through the declarative approach, the amount of Java and JavaScript code utilized can be reduced, including code written to provide an interface between functions and/or layers. The Java and JavaScript code can be replaced with high-level specifications, including page configurations and program configurations. An example of an Ajax web application implementation of the present disclosure is the FORWARD platform developed at the University of California at San Diego. The FORWARD platform implements a declarative approach to Ajax web application implementation, permitting the use of SQL-based languages to facilitate integration and data coordination. Implementations using other declarative languages and formalisms for data management also are within the scope of this disclosure.

The present inventors recognized the need to use SQL-based code to facilitate integration between application layers and to enable automatic optimization. The present inventors also recognized the need to program configurations to declaratively specify either or both of web application pages and programs that are executed when a request is received. The need to provide access to a unified application state virtual database that includes both the persistent database associated with an application and transient memory-based data also was recognized.

Further, the present inventors recognized the need to perform operations, e.g. read and write, on an application's unified state. The present inventors also recognized the need to create, during application execution, a new page in accordance with the corresponding page configuration. Additionally, the present inventors recognized the need to provide unified access to browser-side and server-side data, including data stored both in the associated database and in the application server memory.

In general, in one aspect, the subject matter can be implemented to include establishing access to at least two scoped data sources, wherein each scoped data source has one or more corresponding data source instances; receiving, by a processor, a request and selecting, for each of the at least two scoped data sources, a data source instance; receiving, by the processor, one or more commands, each command referring to at least one of the at least two scoped data sources; and performing, responsive to the one or more commands, one or more operations on the selected data source instances.

The subject matter also can be implemented such that each received command is a read command or a write command. Further, the subject matter can be implemented such that a scoped data source of the at least two scoped data sources is a database. Additionally, the subject matter can be implemented such that at least one received command is a read command expressed in either or both of a declarative mapping language and a declarative update language.

The subject matter also can be implemented such that a scoped data source of the at least two scoped data sources is a session-scoped data source. Further, the subject matter can be implemented such that a scoped data source of the at least two scoped data sources is a window-scoped data source. Additionally, the subject matter can be implemented such that a scoped data source of the at least two scoped data sources is a request-scoped data source.

The subject matter also can be implemented such that performing one or more operations further includes at least one of determining that a received command is a read command to be performed on a scoped data source residing on a client and copying data from the client to a server before performing the read command, and determining that a received command is a write command to be performed on a scoped data source residing on the client and copying data from the server to the client after the write command is performed. Additionally, the subject matter can be implemented such that performing one or more operations further includes performing, for each command, an equivalent command on each of the selected data source instances.

In general, in another aspect, the techniques can be implemented to include receiving a page configuration that specifies an association between a markup language and results of one or more read commands performed over data sources, wherein at least one of the data sources is a database and at least one data sources includes values corresponding to user interface controls on a page instance; computing, in response to one or more detected events, a result of the one or more read commands; and rendering the computed result on a client display, wherein the rendering is performed solely with reference to the specified association.

The subject matter also can be implemented such that at least one of the one or more read commands is a declarative query. Further, the subject matter can be implemented such that computing a result of the one or more read commands further includes computing the result by partial update of the page instance. Also, the subject matter can be implemented such that the page configuration specifies one or more visual units and associates one or more output attributes of at least one of the one or more read commands with an attribute of the one or more visual units; and the computed result is rendered on the client display by the one or more visual units. Additionally, the subject matter can be implemented such that the computed result includes nesting, variability, and/or ordering.

In general, in another aspect, the subject matter can be implemented as a system including a page configuration and a plurality of data sources stored on computer-readable media and a computing system including processor electronics configured to perform operations including receiving the page configuration specifying an association between a markup language and results of one or more read commands performed over the data sources; computing a result corresponding to the one or more read commands to initialize a page instance; rendering the computed result on a client display; computing, in response to a detected event, a second result of the one or more read commands by partial update of the page instance, wherein the partial update is computed solely with reference to the specified association; and rendering the computed second result on the client display.

The system also can be implemented such that at least one of the data sources is a database. Further, the system can be implemented such that at least one of the one or more read commands is a declarative query. Also, the system can be implemented such that the page configuration further specifies a visual unit and associates one or more output attributes of the one or more read commands with one or more attributes of the visual unit and the computed second result is rendered on the client by the visual unit. Additionally, the system can be implemented such that at least one of the computed result and the computed second result includes nesting, variability, and/or ordering.

The subject matter described in this specification potentially can provide one or more of the following advantages. For example, the described techniques and systems can be implemented to overcome language heterogeneities that can cause an impedance mismatch between the visual, application logic and data layers. Also, the described techniques and systems can be used to implement Ajax pages without using imperative code. Instead, the described techniques and systems can be used to automate distributed computations over both browser-side and server-side state, to permit coordinating the state of the page with the state of the underlying database server and application server data.

These and other potential advantages can be obtained based on the following disclosure, including the figures and claims.

BRIEF DESCRIPTION OF THE DRAWINGS

FIGS. 5A and 5B show an exemplary page data tree that represents a list of proposals in a page.

FIGS. 6A and 6B show an exemplary switch schema corresponding to a page data tree.

FIGS. 7A-7C show an exemplary query.

FIGS. 8A and 8B show an exemplary unit tree.

FIG. 9 shows exemplary SQL statements that define flat views corresponding to the result of relational decomposition of a page schema and a page query.

FIGS. 14A and 14B show an exemplary page configuration.

Like reference symbols and designations in the various drawings indicate like elements.

DETAILED DESCRIPTION

Figure 1:
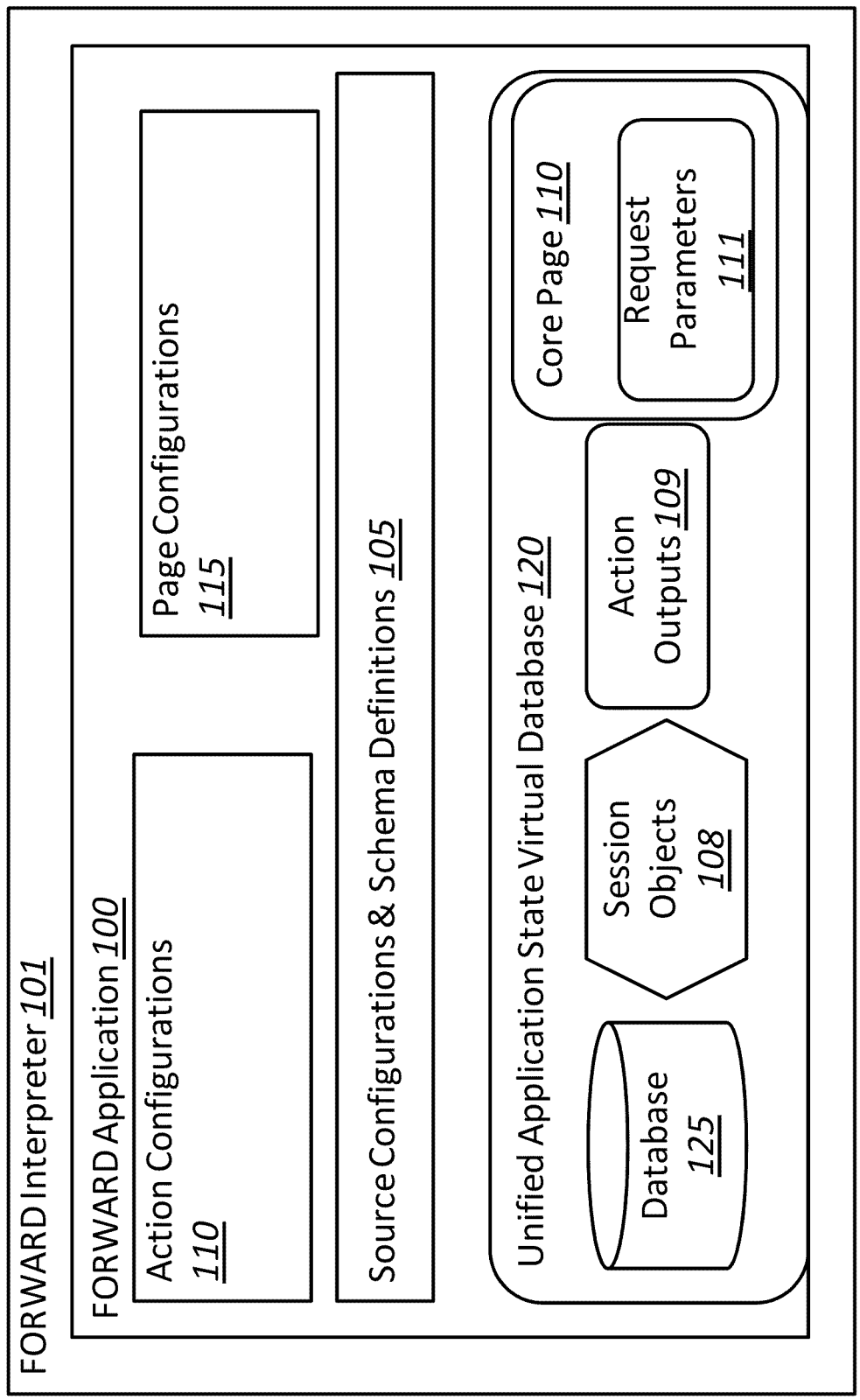
FIG. 1 shows exemplary components of an interactive database-driven web application.

Without any intended limitation, this disclosure employs certain terminology in order to encourage brevity, offer ease of reading, and promote clarity of discussion.

User: An end user operates a client machine to interact with an application residing on a server machine.

Client Machine: A client machine is a digital data processing machine, which is employed by humans to access the server machine. A client machine can be any computing device, including but not limited to personal computers, smart phones, mobile devices, or any other computing devices appropriate to the operations described in this disclosure.

Server Machine: A server machine is a digital data processing machine that provides resources accessible by client machines. The server machine may be provided to various users via a link and client machines or another such arrangement of link(s) and machine(s). A server can be any computing device, including but not limited to a server machine implemented by one or more personal computers, computer workstations, mainframe computers, virtual machines, or other digital data processing devices appropriate to the operations described in detail below. According to one embodiment, the server machine is implemented by a computer workstation with resources sufficient to serve the anticipated number of client machines and processing load.

Link: A server machine is coupled to various client machines by communications links, which may be implemented with numerous different hardware and communications protocols, with some examples including Internet, Intranet, satellite, LAN, WAN, fiber optic network, Ethernet, wireless telephony, landline telephony, etc. The server machine may also be the same physical machine as the client machine, in which case the link includes main memory, UNIX domain sockets, or any other communications link that does not cross physical machine boundaries.

Client Software: Client software is software operating on the client machine that allows a user to access an application. Without any intended limitation, client software includes web browsers, X Window clients, mobile applications, Rich Internet Applications (RIA) runtimes, thin client software, messaging clients or other software appropriate to communicating with the server software. The present disclosure focuses on web browsers as exemplary client software.

Server Software: Server software is software operating on the server machine. Without any intended limitation, server software includes web servers, application servers, X Window servers, middleware servers, presentation servers, messaging servers or other software appropriate to communicating with the client software. The present disclosure focuses on web servers and application servers as exemplary server software.

Request: A request refers to a message sent by the client software when communicating with server software. Without any intended limitation, the present disclosure focuses on HTTP requests.

Response: A response refers to a message sent by the server software when communicating with client software. Without any intended limitation, the present disclosure focuses on HTTP responses.

Session: A session refers to a logical grouping of requests and responses that are exchanged between server software and client software, such that a session is established at a certain point in time and torn down at a later point in time. Certain requests issued by the client during such time are said to belong to the same session. Without any intended limitation, the present disclosure focuses on HTTP sessions, whereas HTTP requests belong to the same HTTP session if they are issued with the same session cookie in the HTTP headers.

Window: A window refers to a visual area, e.g. of the client software, that is suitable for displaying data and accepting user interaction. Two or more windows may be allowed to overlap in their visual areas, and a user may be allowed to choose which window is active for interaction at any given time, while preserving the contents of the inactive window(s). For example, and without limitation, a window can be implemented by a window of a windowing system, a web browser, a tab of a multiple document interface (MDI), a virtual desktop of a desktop environment or other client software mechanisms that provides a visual area for a user to interact with an application.

User Interface Controls: A user interface control refers to a graphical user interface element for displaying data and accepting user interaction or input. Without any intended limitation, user interface controls include labels, text boxes, buttons, drop-down boxes, progress bars, dialog boxes or other elements of a graphical user interface.

Events: An event refers to a notification that some activity has occurred in either the server software or client software. Without any intended limitation, events include timer events, user interface controls events such as button clicks, key presses and selection changes, the firing of database triggers for insert, update and delete commands being executed in a database, the receipt of messages in a messaging system, or other notifications of activity appropriate within server software or client software.

Rendering: Rendering refers to one or more operations that are performed to update the visual areas within client software, so that these visual areas may be used for displaying data and accepting user interaction.

Application: An application refers to interactive software that can be accessed by one or more users. Without any intended limitation, the present disclosure focuses on web applications.

Page Instance: A page instance refers to a data structure that is an abstract representation of a screen produced by an application, such that the page instance can be rendered within client software to produce a visual area that is suitable for displaying data and accepting user interaction. To construct page instances, the application performs computation such as retrieving data and rendering the data for display. In addition the application may accept user-provided input from the page instances and utilize them for computation. An example is the Yahoo™ Finance database-driven web application that, among other pages instances, produces web page instances that provide stock market quotes and other financial information upon being provided a stock market ticker symbol by the user (via a web browser).

Page configuration: A page configuration specifies how to perform computation such as retrieving data and rendering the data for display, such that page instances are constructed in accordance with the specification.

Markup Language: A markup language refers to a specification/configuration language, where elements of the language indicate the formatting, styling and layout of text, links, images, videos and other media types within a page instance. Without any intended limitation, markup languages include HTML, SVG, XSLT, wiki markup (such as Creloe, Textile and Markdown), templating languages (such as Django, Velocity and Closure Templates), or other specification/configuration languages used to specify visual formatting and layout.

Data Source: A data source refers to a data structure that is an abstract representation of data that allows retrieving and/or modifying said data. A data source can represent persistent data, transient data, or a combination of both. It can represent data on the server machine, data on a remote machine accessible via a link, or a combination of both. Without any intended limitation, a data source can represent data that are stored directly to a storage medium (such as main memory or disks), derived data that are produced by computation for the purpose of records being retrieved (such as parameterized views), derived data that undergo transformation for the purpose of records being modified (such as updateable views), or a combination of the above. Without any intended limitation, data sources include relational databases, XML databases, document databases, LDAP databases, HTTP session objects, query parameters of a HTTP request, SOAP web services, data associated with a web browser window, values of user interface controls on a page instance, or any other mechanisms that allow retrieving and/or modifying data.

Scoped Data Source and Data Source Instance: Server software can provide scope for a data source, such that a scoped data source has one or more data source instances, and at most one data source instance of a scoped data source is associated with a request.

Command: A command is a procedure that is expressed over either a data source or data source instance. A command may declare parameters, and when executed will receive input arguments conformant to the parameters.

Read Command: A read command is a command that retrieves data from either a data source or data source instance, and returns them to the caller. Without any intended limitation, read commands can be specified declaratively in database query languages, such as SQL and XQuery, as well as imperatively in programming languages such as C and Java.

Write Command: A write command is a command that modifies data of either a data source or data source instance. Without any intended limitation, commands can be specified declaratively in database languages, such as SQL DML statements and the XQuery Update Facility, as well as imperatively in programming languages such as C and Java.

Partial Update: Partial update refers to any technique by which changes to a data structure occur by updating one or more sub-structures within the data structure, instead of replacing the data structure in its entirety. Without any intended limitation, partial update techniques include incremental computation within a spreadsheet package to update only cells containing formulae which depend directly or indirectly on changed cells, reactive programming systems that automatically propagate updates along data flows, incremental view maintenance within database systems that incrementally maintain materialized views with delta queries and delta propagation, and any other techniques that update a data structure partially.

Record: A record is any data object that has attributes. For example, a "person" record has attributes such as "first name", "last name", "SSN" etc. It is possible that a record contains nested records. Without any intended limitation, records can be implemented as tuples of a relational database table, XML elements of XML databases, Java objects carrying attributes/properties, or any other mechanisms for representing data objects and attributes.

Database: A database contains persistent data including collections of records of various types that conform to a schema. Without any intended limitation, schemas can be relational schemas, XML schemas, or any other specifications that captures aspects of data such as the types of records of the database, records' attributes, records' relationships and constraints that the records may have to satisfy (such as uniqueness constraints or referential integrity constraints), and the like.

Declarative Query Language: A declarative query language is a language that allows expressing read commands over a data source, such that the intended results of the read commands are specified without describing control flow or the algorithm by which the intended results should be computed. Without any intended limitation, examples of declarative query languages include SQL and XQuery.

Declarative Mapping Language: A declarative mapping language is a language that allows expressing a function that inputs data from a data source that conforms to an input schema and outputs data that conform to an output schema and such function is expressed simply by drawing relationships between the input and the output attributes (as opposed to using an algorithm or a declarative query language). Without any intended limitation, examples of mapping languages include languages where the relationship is in the form of lines connecting the input and output attributes.

Declarative Update Language: A declarative update language is a language that allows expressing write commands over a data source, such that the intended results of the write commands are specified without describing control flow or the algorithm by which the intended results should be computed. Without any intended limitation, declarative update languages include SQL DML statements and the XQuery Update Facility.

Nesting: Nesting refers to a record's attribute recursively being either another record or a collection of records. An example of a data model that provides nesting is XML, where each XML element can recursively contain one or more XML elements.

Variability: Variability refers to a record's attribute having a value that may be one of several different types. Only one of the types can be in use at any one time. An example of a data model that provides variability is Haskell's data model, which has algebraic data types that can be operated upon by pattern matching against a fixed set of patterns.

Ordering: Ordering refers to a collection maintaining the positions of each record in the collection relative to the positions of other records. An example of a data model that provides ordering is XML, where the relative position of each XML element within its parent is significant.

FIG. 1 shows exemplary components of an interactive database-driven web application. An interactive database-driven web application (or "web application" or "FORWARD application") 100 can have a set of declarative configurations, including (a) one or more source configurations 105 and respective schema definitions, (b) one or more action configurations 110, and (c) one or more page configurations 115. To facilitate deployment, an interpreter, such as 101, can interpret the configurations of the web application. The web application's pages can be declaratively specified using page configurations 115. The actions that are executed when a request is issued can be declaratively specified, using action configurations 110. In some implementations, the page configurations and the action configurations can be based on a version of SQL, e.g. the SQL++ described below, which provides access to a unified application state virtual database 120. The unified application state virtual database 120 can include a persistent database 125, session-scoped objects 108, output data of actions 109, abstractions of page data such as core page data 110 and request data 111, and other data that an application may access.

The web application can execute in a continuous action/page cycle. For instance, an HTTP request can trigger the web application interpreter (or "FORWARD interpreter") to execute an action configuration 110. Further, the action can read and write the unified application state 120. In some implementations, the action also can invoke one or more services that have effects beyond capturing the unified application state, such as sending an email. The action also can identify a page to be displayed next. The web application interpreter can generate a new page according to the respective page configuration. The page configuration also can specify actions that are invoked upon specified user events. The invocation of an action restarts the action/page cycle.

A page configuration can be implemented as a rendered view that presents dynamic data, e.g. generated by SQL++ or other data binding language that creates an association between server data and page data. A page configuration can be automatically updated by the web application. Further, a page configuration can enable the creation of one or more pages, e.g. Ajax pages, that feature HTML and Ajax/JavaScript visual units, such as maps, calendars, and tabbed windows, simply by tagging data with an appropriate tags, such as <map>, <calendar>, etc. An enabled page can be automatically updated by the web application interpreter by use of incremental view maintenance. Further, as discussed later, the web application developer need not coordinate data from the server with the Ajax components of a page to permit automatic updating.

The action configurations 110 have easy unified access to both the browser data and the database, because the web application guarantees that the browser's page data are correctly reflected in the page data of the unified application state virtual database 120 before they are used by the actions. Further, the page configurations 115 and action configurations 110 have unified access to the unified application state virtual database 120 through a common language, e.g. SQL++. Use of other languages, such as Java or JavaScript, can be reserved for separate tasks, such as creating a custom visual unit or for computations not easily expressible in the common language.

Database-Driven Web Applications

Figure 2:
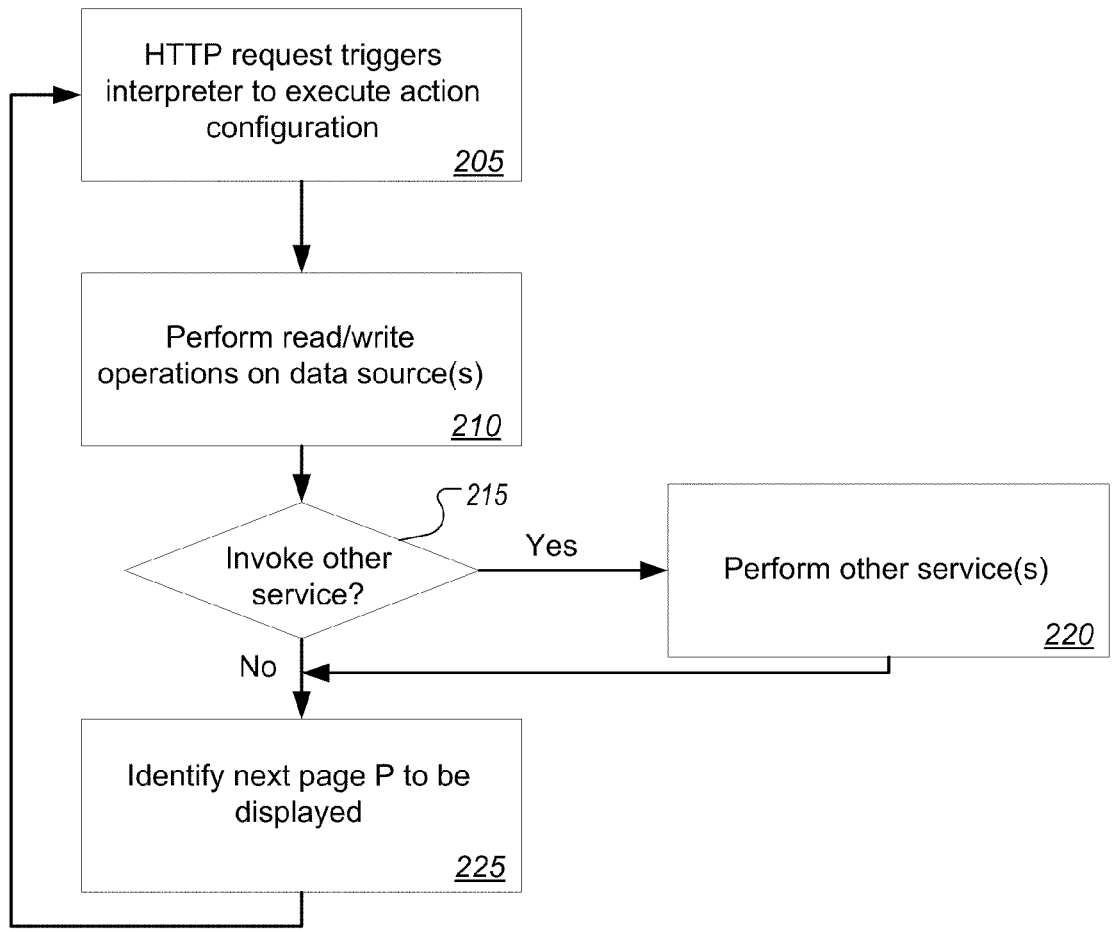
FIG. 2 shows an exemplary process flow for the execution of a database-driven web application

FIG. 2 shows an exemplary process flow for the execution of a database-driven web application. This description also is applicable to interactive applications beyond web applications, including e.g., smart phone applications. Modifications made to adapt the web application to other application frameworks and platforms are within the scope of the implementation presented.

In the context of Model View Controller (MVC)-based frameworks, such as Struts and Spring, a web application's operation can be explained using action-page cycles. An HTTP request can trigger the web application's interpreter to execute the action configuration that is associated with a URL corresponding to the request (205). Executing the action configuration can cause read and/or write operations to be performed with respect to various data sources, such as the persistent database 125, request data, session data (210). Executing the action configuration also can invoke services that have effects beyond one or more of the data sources, such as invoking a service to send an email. It can be determined whether any other services are to be invoked (215) and if so, the one or more other services can be performed (220). Further, the action can identify which page P is to be displayed next (225).

Conceptually, the web application's interpreter can generate a new page based on the page configuration corresponding to page P. The new page can be thought of as a rendered view definition and can be displayed in the browser. Further, the displayed page P can captures browser events, such as a button click or a mouse-over, or a browser-side timer leading to polling. A browser event further can lead to an action invocation, e.g. via an HTTP run, that continues the action-page cycle.

Unified Application State

Figure 3:
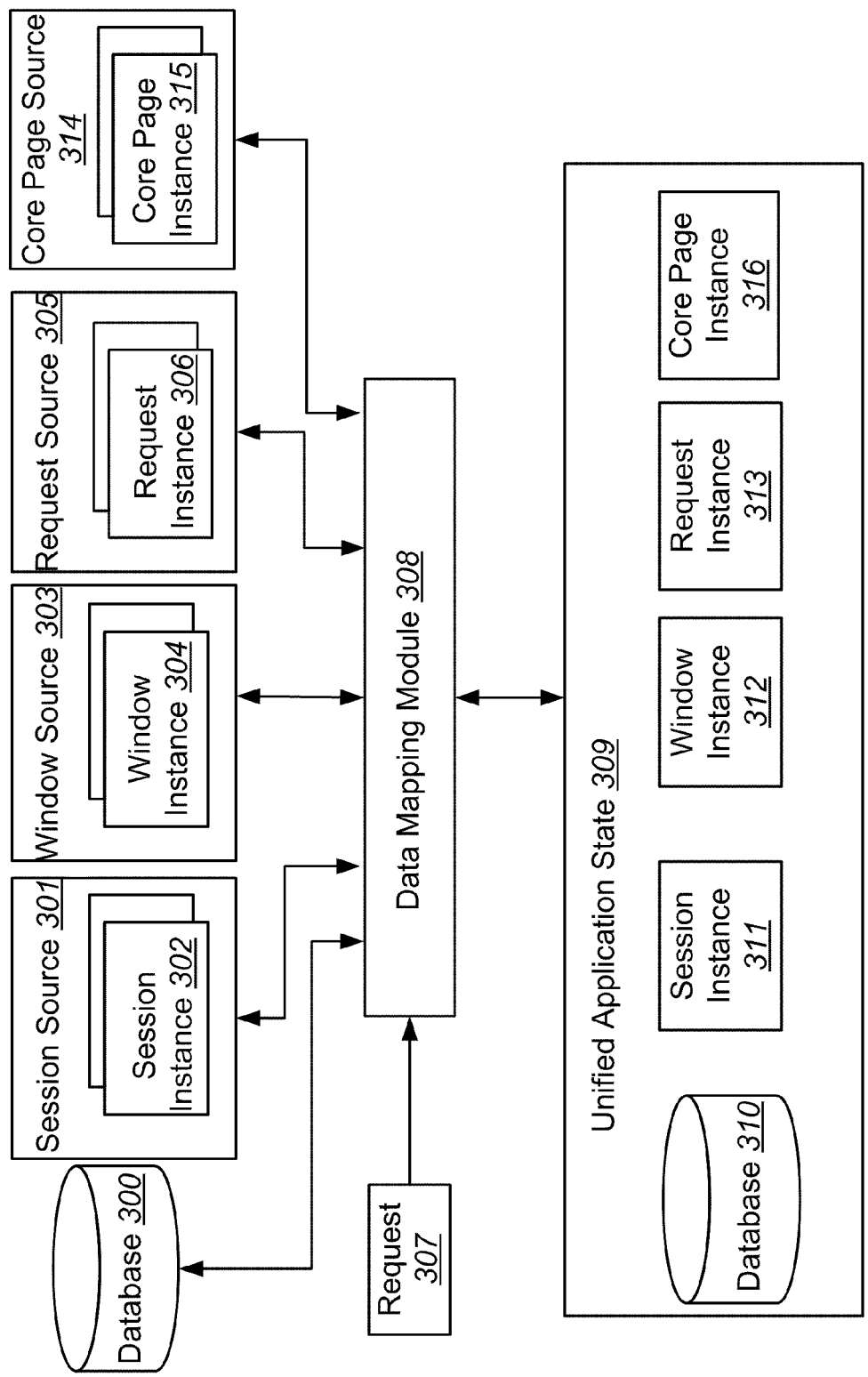
FIG. 3 shows an exemplary implementation of the unified application state.

FIG. 3 shows an exemplary implementation of the unified application state. The unified application state can be implemented as a virtual database that has multiple data source instances, including scoped data sources. Further, the unified application state can enable pages and actions to access data associated with multiple sources as if that data was the data of a single source.

For each data source participating in the unified application state, a source configuration indicates the data source type, e.g. relational database, LDAP server, or spreadsheet, and how to connect to the data source. In some implementations, such as cloud-based applications, the web application can be configured to implicitly provide a hosted database 300, e.g., a SQL++ database source. The hosted database 300 can provide the full persistent data storage of the application and can represent the persistent database 310 portion of the unified application state.

The unified application state also can include a session source 301, a window source 303, and a request source 305, which are main memory-based scoped data sources. As the session source 301, the window source 303, and the request source 305 are session-scoped attributes provided by one or more application servers, any or all of the session source 301, the window source 303, and the request source 305 can have more than one instance at any time, and such instances can have limited lifetimes. For example, the session source 301 can exist for the duration of a browser session. Upon receipt of a request 307, e.g. an HTTP request, the web application's data mapping module 308 can select a particular session instance, e.g. session instance 302, and can make the selected session instance 302 available to any or all of the one or more actions and pages activated by the request 307. In particular, the session instance 302 can be added to the unified application state 309, e.g. as a session instance 311. Incorporation of the session instance 302 into the unified application state 309 can be virtual, as the unified application state 309 can exist as a conglomeration of one or more instances. All of the page instances of a browser session, e.g. session source 301, and all of the actions initiated by requests, e.g. request 307, associated with the browser session can have access to the same session instance 302 of the session source 301, which conceptually can exist in the unified application state 309 as session instance 311. Further, pages and actions of another browser session can be assigned one or more separate session data source instances.

Similarly a request instance 306 can have a corresponding request instance 313 associated with the unified application state 309. The request instance 313 can be a virtual instance, signifying incorporation of the request instance 313 into the unified application state 309. The request instance 313 can be generated by the data mapping module 308 and can exist for the duration during which an action processes an associated request. Further, each action that is being executed can be assigned its own request instance, e.g. request instance 313.

A window instance 304 also can be associated with the window source 303. The window instance 304 can be incorporated into the unified application state 309, e.g. as counterpart window instance 312 generated by the data mapping module 308. The window instance 312 can be virtual. Further, the window instance 312 can exist for the duration of a corresponding browser window and can be made available to one or more other pages displayed in the browser window and to all actions initiated by events associated with the browser window. The persistent database 300 has a single instance, independently of the request 307, which becomes the persistent database 310 portion of the unified application state.

Yet another data source is the core page source 314, which also can have one or more page instances, e.g. core page instance 315. A core page instance can be an abstraction of the data displayed and collected by a browser. In some implementations, the structure of the core page source 314 can be determined by one or more page configurations 115, according to details described later. A corresponding core page instance 316 can be a virtual instance, signifying incorporation of the core page instance 315 into the unified application state 309. The core page instance 316 can be generated by the data mapping module 308 and can exist for the duration of the core page source 314.

One method, implemented in FORWARD, for enabling the unified application state is by the data mapping module 308 that, upon the reception of a request 307, copies the relevant instances of the session, request and window-scoped data sources into the db source 310. One can generalize this method as follows: All but one of the source instances of the unified application state can be copied into a chosen target data source. In the preferred embodiment (the FORWARD system) the target data source is the db but in other implementations it need not be. Consequently any read or write commands targeted to the unified application state are translated into read or write commands on such target source. In effect a mirror of all relevant source instances is created in the target source and the programs and actions can operate as if they deal with only one source.

Schema of Data Sources

Each data source can store one or more objects. Further, each object can have a name, a schema, and associated data. In the web application, the schema can be explicitly created, e.g. using the Data Definition Language (DDL) of SQL++. Alternatively, the schema can be imported from the data source. For example, the schema of a relational database source can be imported from its catalog tables. The schema can be a tuple, and an attribute of the tuple can be either a scalar type or a table, whose tuples have attributes that may recursively contain nested tables.

Additionally, in order to permit variability in query languages, such as XQuery and Object Query Language (OQL), some query languages, e.g. SQL++, also can support a union construct, such as provided by OQL.

Figure 4:
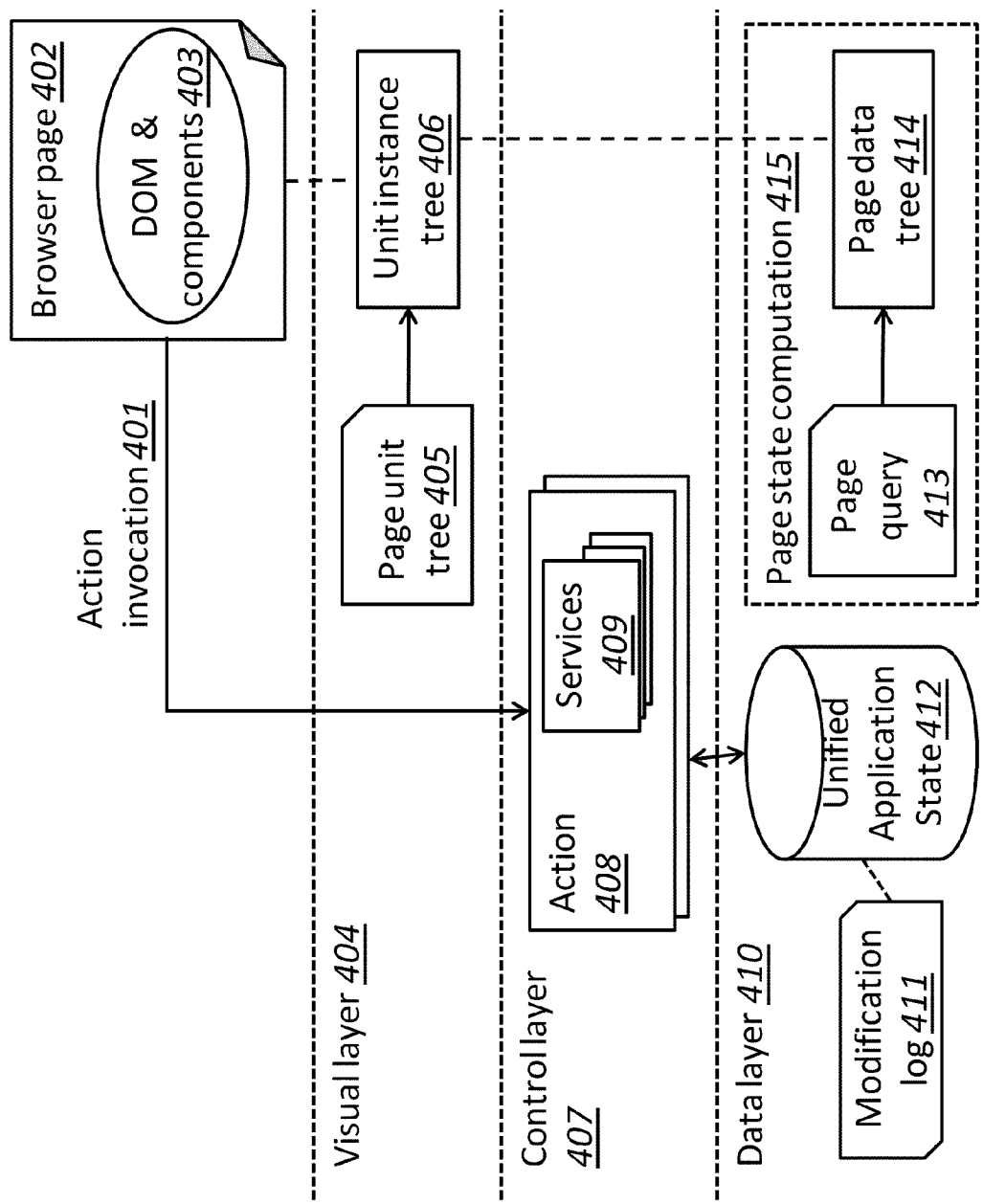
FIG. 4 shows an exemplary implementation of the web application framework.

FIG. 4 shows an exemplary implementation of the FORWARD web application framework, where processing is split across the three conventional layers of Model-View-Controller (MVC) implementations; namely, the data layer 410, the control layer 407 and the visual layer 404.

A page configuration, e.g. page configuration 115, can be compiled into a page query 413 and a page unit tree 414. During runtime, at the data layer 410, a page query 413 can be evaluated by the page state computation module 415, and its evaluation results into the page data tree 414, which can capture the browser page 402 at a logical level. The page also has a page unit tree 405. During runtime, at the visual layer 404 the page unit tree is evaluated, and its evaluation results into the unit instance tree 406 that that maps into the data tree 414 and renders the page data into an HTML page (DOM & components) 403. The rendered HTML page 403 can include additional code, such as JavaScript and/or Ajax components.

The page query 413 can be an SQL statement or another query language. For instance, the SQL++ that is used in FORWARD and is an extension of SQL. In particular, SQL has been minimally extended with (a) SELECT clause nesting, (b) variability of schemas in SQL's CASE statements and (c) ordering.

A user request, such as submitting a form or clicking a button, issued from the context of a unit leads to an action invocation 401, which can update the unified application state 412. Conceptually, the updates can lead to a new page data tree, which can be based on the page query 413 evaluated on the new unified application state, and consequently to a new rendered page.

The web application can be configured to achieve the performance and interface quality of other pages, e.g. Ajax, Flash and Silverlight pages, by automatically resolving performance optimization issues that otherwise would require manual coding by a developer. For instance, instead of creating a new page data tree 414, page unit instance tree 406, and browser page 402 from scratch in each step, the web application can incrementally compute any or all of the page data tree 414, page unit instance tree 406, and browser page 402 using their prior versions. Since the page data tree 414 is typically fueled by queries, the data layer can leverage prior database research on incremental view maintenance, essentially treating the page data tree 414 as a view. Incremental view maintenance further can be implemented to capture (a) nesting, (b) variability of the output tuples, and (c) ordering. Further, the web application provides an architecture that can enable the use of massive JavaScript/Ajax component libraries, such as Dojo, as page units into the web application framework. The basic data tree incremental maintenance algorithm can be modified to account for situations in which a component may not offer methods to implement each possible data tree change. A best-effort approach is enabled for wrapping data tree changes into component method calls.

In the web application, each page data tree 414 has a corresponding page schema. The page unit tree 405 synchronizes between the page data tree 414, which conforms to the page schema, and the browser page state 402, which includes the state of JavaScript components and HTML DOM and components 403. As a user interacts with a page, events can occur which are triggered by either a direct user action (e.g., clicking a button) or other mechanisms such as timers. Further, an event can lead to an action invocation 401 of a server-side action 408 that updates the server state. An action has access to the unified application state 412, which can include the request data source, which, in turn can include form data pertaining to the user interaction and the context of the user interaction. The latter describes, for instance in the case that a page involves multiple buttons, which particular button instance was clicked by the user. Using these data, the action 408 can issue one or more commands, e.g. INSERT, UPDATE, and DELETE commands, on the unified application state 412. In the web application, the complete state can be captured in its entirety by the unified application state. Therefore the full set of state updates can be captured by a modification log 411, e.g., by storing all DML commands on the database's tables. After the action invocation 401, a page state computation module 415 can create or revise the page data tree 414 according to the new browser page state 402, so that it reflects, for instance, the data typed by the user into the form In order to support the Ajax incremental update of a page (as performed in Ajax, Flash, Silverlight and other web applications), the respective renderers of units translate the data difference between the old page data tree and the new page data tree, e.g. to method calls of JavaScript components and/or updates to the HTML DOM 403. Furthermore, the data difference can be automatically computed in an incremental way without recomputing the page state from scratch. This is possible because the computation of a page's data is specified using the page query 413. As a result, the page data tree 414 can present a view over base data of the unified application state. Further, the framework logs the modifications to the state of the base data in the same application and employs incremental view maintenance techniques to obtain the changes to the view.

The page data tree 414 can capture the page's state at a logical level using an extension of SQL's data model with the following features that will facilitate mapping to the page data from the unit instance tree 406. The extensions are commensurate with the extensions, described above, on SQL queries. In particular, the page data tree 414 can have both unordered sets and ordered lists to indicate whether the ordering of tuples is relevant. Further, the page data tree 414 can have nested relations, e.g., nested reviews within proposals. Additionally, the page data tree 414 can allow heterogeneous schemas for the tuples of a collection. For example, a tuple corresponding to the display mode of the cells of the "My Review" column of FIG. 11 (e.g., the "my Review" of proposal 701 is in display mode), carries atomic attributes that correspond to "Comment" and "grade". In contrast, a tuple that corresponds to the input mode of a cell of the "My Review" column (e.g., the "My Review" of proposal 509 is in input mode) also carries the nested list of grade options.

The schema of a page data tree 414 can be captured by a page schema tree. Each data node (or value) of the page data tree 414 maps to a schema node of the page schema tree (which we may also call page schema or schema tree), and the page data tree 414 is homomorphic to the schema tree. The page schema tree dictates the types and structures used in the page data tree. For instance, the page schema tree can define that a page data tree (also called a "value of the page schema tree") can be one of the following: (1) an atomic value, such as string, integer, Boolean etc.; (2) a tuple, which is a mapping of attribute names to values, whereas attributes are distinct; (3) a collection, which contains tuples such that tuples are homogeneous, i.e. each maps to the same schema node. The schema node specifies a primary key constraint, such that tuples in the collection are uniquely identifiable. An unordered collection is a set, whereas an ordered collection is a list. The primary keys will play a key role in the incremental maintenance of the page; (4) a switch value, which is a tagged union of case/value pairs, such that only one pair can be selected. While the switch value represents only the selected pair, the switch schema represents the schema of all possible case/value pairs; and (5) a null value.

FIGS. 5A and 5B show an exemplary page data tree that represents a list of proposals in a page. The list of proposals corresponds to the exemplary Review Proposals page of FIG. 11. In a proposal tuple, title 505 represents an atomic string value, reviews 510 represents a nested set of review tuples, and my_review 515 is a switch value where the input_tuple case is selected. FIGS. 6A and 6B show an exemplary page schema tree, such that the nodes/values of the page data tree of FIGS. 5A and 5B map to the page schema tree of FIGS. 6A and 6B. The switch schema of FIGS. 6A and 6B includes both an input_tuple 605 case and a display_tuple 610 case, indicating that a review can be conducted either in input mode or in display mode.

FIGS. 7A-7C show an exemplary query. SQL can be extended for nesting and variability. With respect to queries, a query that does not include an ORDER BY clause produces a set, while a query that includes an ORDER BY clause produces a list. The query 700 shown in FIGS. 7A-7C can produce the Review Proposals page data tree of FIGS. 5A and 5B. Further, the query 700 operates over four database tables: proposals, assignments to reviewers, reviews that have been submitted, and draft_reviews that have been saved. The query 700 also operates over a special collection, current_session, which provides a single tuple of HTTP session attributes.

Lines 701-747 of the query 700 represent the outer query that produces a list of proposals. Further, lines 703-707 represent a review sub-query 705 that produces a set of reviews by reviewers other than the current user. Review sub-query 705 is a conventional SQL sub-query that is parameterized by tuple variables P and S from query 700. By allowing nested queries in the SELECT clause the query language can construct results that have nested collections. A bar_chart sub-query 710 at lines 709-713 is similar to the review sub-query 705 except for the ORDER BY clause 715, which causes the result to be produced as a list instead of a set.

The my_review query 720 at lines 715-732 features a SQL CASE WHEN . . . ELSE . . . END conditional expression that determines if a reviewer's review is an input tuple or display tuple based on whether the corresponding draft review is valid or not. The extension for heterogeneity allows the CASE expression to become a constructor for switch values, whenever each branch evaluates to a (potentially heterogeneous) case:value pair. In general, various constructor functions/operators provide convenient syntax for creating values of the data model. Another example is the tuple constructor on line 718. Also, the average_grade sub-query 725 at lines 734-738 uses the AVG aggregation function to calculate the average review grade for a proposal. Additionally, the existential quantification sub-query 730 at lines 741-746 serves to filter proposals that have been assigned to the current user.

Visual Layer

Web application units (or "FORWARD application units") capture the logical structure of a page, including the action invocation requests that may be issued from it. Further, web application units (or FORWARD units) enable the incorporation of components from JavaScript libraries, such as Dojo and YUI, into the web application framework. Each page has a unit tree 405 (including units), and each instance of a page has a corresponding unit instance tree 406 (including unit instances) that conforms to the unit tree 405, e.g. in a manner similar to how data trees conform to schema trees. Each unit has a unit schema and a homomorphic unit mapping from unit schema attributes to nodes in the page schema tree. The unit schema captures the exported state of the unit and its descendants. The unit mapping induces a mapping from the corresponding unit instances to the nodes in the page data tree, which are termed the unit instance's data.

The web application (or FORWARD) framework can produce the page unit tree and the unit mapping (as well as the page schema and page query) by compiling a page configuration 115. FORWARD also provides a textual template syntax that can be used, for instance, for manually configuring a page unit tree or for displaying a page unit tree that is the result of compilation. FIGS. 8A and 8B show an exemplary page unit tree 800 for Review Proposals, with mappings to the page schema tree of FIGS. 7A-C. Each XML element that is in the unit namespace encloses a unit configuration, which contains (1) XML elements in the default namespace for the unit schema attributes and (2) nested unit configurations for children units. The template also allows HTML elements in the html namespace, thus enabling the configuration of all visual aspects of a page. The bind attribute is used to map unit schema attributes to page schema nodes. For example, the dropdown unit maps to the grade tuple of Line 620 of FIG. 6B, and its ref and options attributes map respectively to the grade_ref (Line 621) and grade_options (Line 622) attributes.

A unit can be associated with one or more action configurations 110 and the respective actions 408, which can result from the compilation of action configurations. When an action is invoked, it has access to multiple data sources, which include, for instance (1) the invocation context, which is the data node mapped from the unit instance of the action invocation, (2) the data of form units, such as textboxes and dropdowns, (3) the persistent SQL database 300, (4) session data source 301. Using these data, the action 408 invocation can execute various services 409. Database services are a common kind of services 409. They issue one or more commands, e.g. INSERT, UPDATE, and/or DELETE commands, on the database, which can be captured by the application's modification log 411. For example, the button unit in FIG. 8B at lines 834-835 associates the click event with a save_review action. When the save_review action is invoked, it uses the corresponding proposal from the invocation context, the grade from unit:dropdown 805, the review from unit:textbox (Line 833 in FIG. 8B), and the current user from the session, and issues an INSERT command on the reviews table.

Incremental Page Refresh

A web application (or FORWARD application) can be configured with the page configurations 115 and provide aspects of the Ajax programming model, namely Ajax's ability to partially update a page by replacing an old page DOM and JavaScript component' state 403 with that of the new page (DOM and components' state 403) at the browser. In contrast to prior work, the provision of partial update of the page does not need any additional specification or configuration pertaining to how the partial update should be implemented. In the web application, pages can be modeled as rendered views so that developers need not specify any extra update logic, while the framework can automate the incremental page refresh in both the data layer and the visual layer to achieve Ajax-like performance. This section describes how incremental page refresh is handled in the data layer and the visual layer.

FIG. 9 shows exemplary SQL statements that define flat views corresponding to the result of relational decomposition of a page schema and a page query. The flat views can be used in conjunction with the Page State Computation (PSC) module described with respect to FIG. 10. In the SQL statements 900, since neither proposals nor current session is changed between the previous and the current page states, $T_1$ is not changed and $\Delta+T_1$ and $\Delta-T_1$ are empty. Further, because change (c) brings a non-empty $\Delta+R_{reviews}$, a Relational Incremental View Maintenance (RIVM) algorithm is able to compute $\Delta+T_2$ by joining $\Delta+R_{reviews}$ and $T_1$ and then performing the selection. In accordance with this framework, the defining queries of all the decomposed flat views of the running example can be incrementally maintained by the RIVM algorithm.

Incremental Page Maintenance

The Page State Computation (PSC) module of the web application (e.g., as described with respect to FIG. 4) treats the page data tree as a view instance. During a page refresh, the PSC uses the log of modifications to the unified application state data to incrementally update the old view instance to the new view instance. In some cases, the PSC can use the unified application state data itself, in addition to or in place of the log of modifications.

Figure 10:
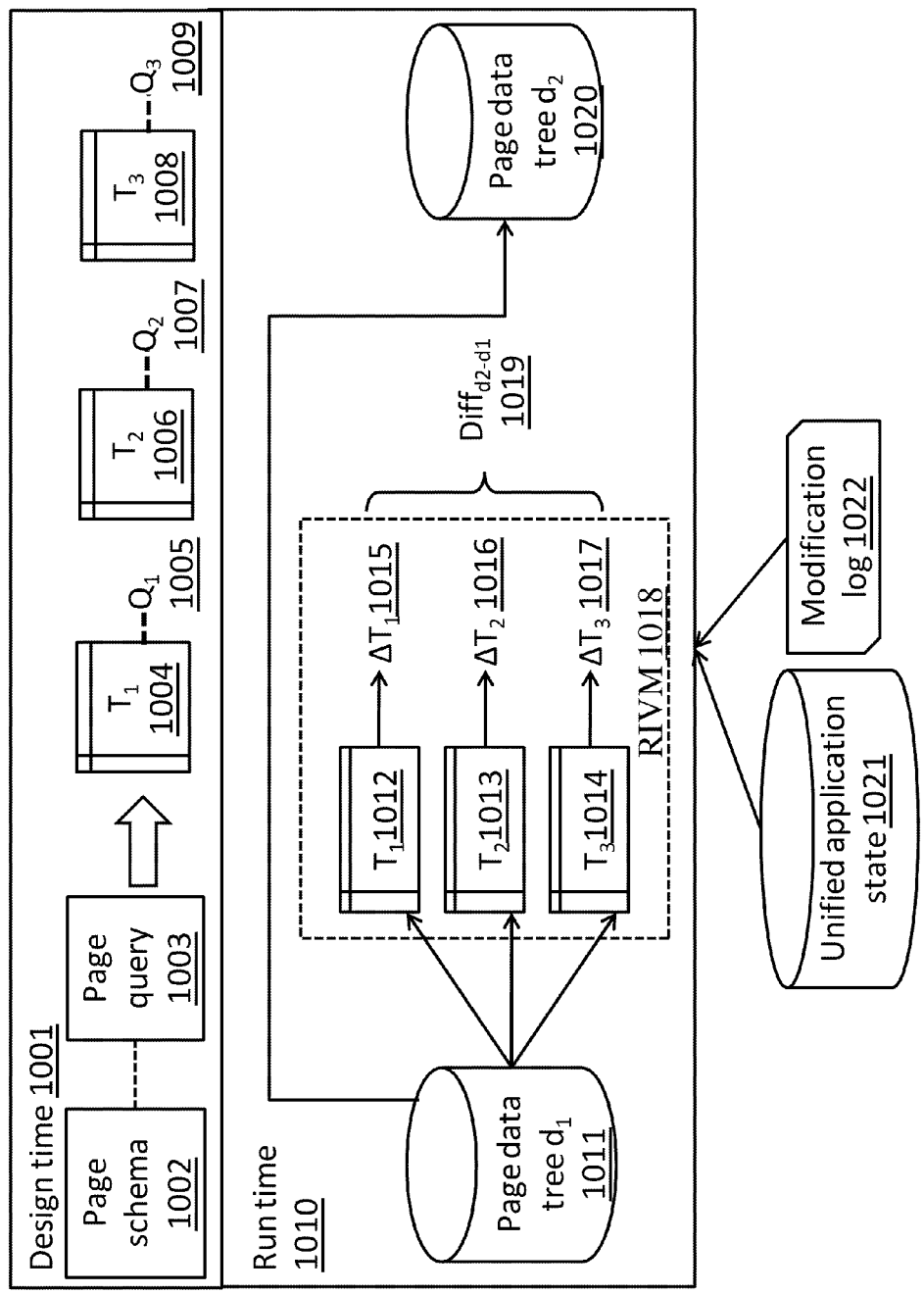
FIG. 10 shows exemplary operations for incremental maintenance of a page data tree.

FIG. 10 shows exemplary operations for modifying a page data tree. For instance, the operations illustrate how the PSC incrementally modifies the page data tree $d_1$ 1011 of the old page (DOM & components) state $s_1$ to arrive at the page data tree $d_2$ of the new page state $s_2$. The operations are presented both in the context of compilation time 1001 and run time 1010.

A page data tree is computed as the result of a page query 1003, which can be a nested query in the web application's language, e.g. the extended SQL language. At design time 1001, the PSC can decompose the nested page schema 1002 into flat relational views, e.g. as denoted by $T_1$ 1004, $T_2$ 1006, and $T_3$ 1008. Further, the PSC can translate (or rewrite) the page query 1003 into one or more standalone SQL queries, e.g. as denoted by queries $Q_1$ 1005, $Q_2$ 1007, and $Q_3$ 1009, that define the flat relational views, e.g. views $T_1$ 1004, $T_2$ 1006, and $T_3$ 1008 respectively. At run time 1010, the old page data tree $d_1$ 1011 is first transformed to instances of the flat relational views, e.g. instances $T_1$ 1012, $T_2$ 1013, and $T_3$ 1014. In some implementations, the nested schema of the unified application state 1021 can also be decomposed into actual or virtual flat relational tables. Further, the PSC can apply a Relational Incremental View Maintenance (RIVM) algorithm 1018 to each instance of the flat relational views, utilizing either or both of data from the unified application state 1021 and the modification log 1022.

The incremental changes (or differences) to the instances of the flat relational views computed by the RIVM algorithm 1018 can be translated into a data difference $\text{Diff}_{d2-d1}$ 1019. For instance, the RIVM algorithm 1018 can be used to compute an incremental change $\Delta T_1$ 1015 corresponding to the instance $T_1$ 1012, an incremental change $\Delta T_2$ 1016 corresponding to the instance $T_2$ 1013, and an incremental change $\Delta T_3$ 1017 corresponding to the instance $T_3$ 1014. Further, the incremental changes $\Delta T_1$ 1015, $\Delta T_2$ 1016, and $\Delta T_3$ 1017, can be translated into the data difference $\text{Diff}_{d2-d1}$ 1019. The data difference $\text{Diff}_{d2-d1}$ 1019 further can be combined with the old page data tree $d_1$ 1011 to calculate the new page data tree $d_2$ 1020.

In some implementations, the RIVM algorithm 1018 associated with the PSC can be built on top of an off-the-shelf relational database without modification to the database engine. The web application framework can monitor all data modification in the application to maintain the modification log and can expand the log to capture data changes with respect to each unified application state table. Additionally, the modification log and page data trees can be stored in main memory resident tables, e.g., of a database management system (DBMS), for fast access.

The data difference $\text{Diff}_{d2-d1}$ 1019 can be encoded as a series of data modification commands used to translate the page data tree $d_1$ 1011 into the page data tree $d_2$ 1020. The data modification commands can be any commands, including insert, remove and update. The remove command remove(t) can be configured to locate the node identified by t in a data tree and to remove the subtree rooted at that node. The update command update(t, N) can replace the old subtree rooted at t with the new subtree N. The insert command can have a set-version and a list-version for the two different types of collections. The set-version insert_s(r, N) can be configured to insert a subtree N rooted at a tuple into the targeted set identified by r. The list-version insert_l(r, N, t1) can be configured to take one more parameters t0, which represent the adjacent node after which the identified new subtree is to be inserted.

Benefits and Example

Figure 11:
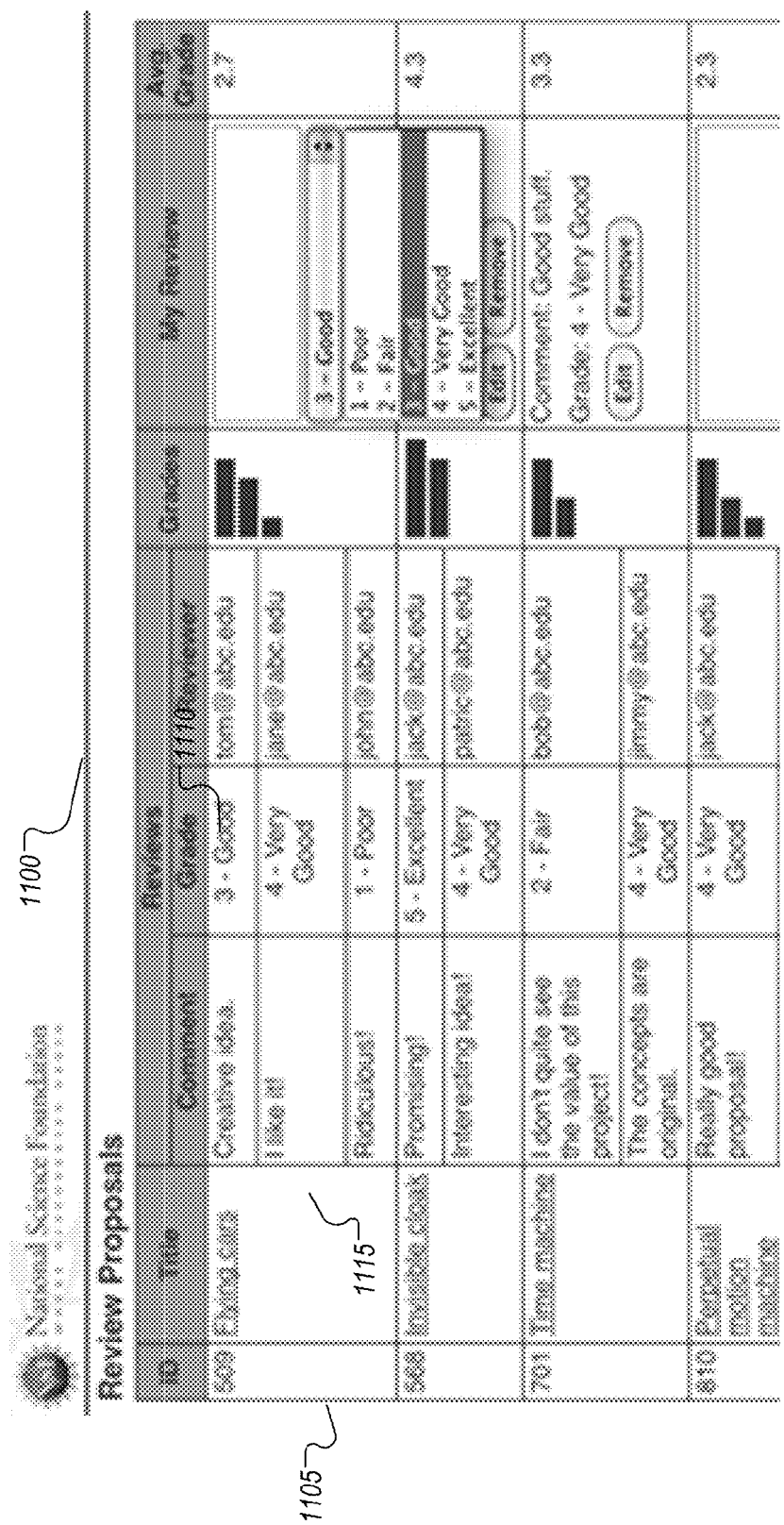
FIG. 11 shows an exemplary display corresponding to a web application.

FIG. 11 shows an exemplary display corresponding to a web application. Use of the PSC can significantly reduce the number of SQL queries that are run in order to refresh a page, e.g. page 1100. The efficiencies of using the PSC can be realized by detecting one or more opportunities, including non-modification, page state self-sufficiency, and incremental maintenance. With respect to non-modification, the PSC can prove during compilation time 1001 that one or more data tree nodes are unaffected by a data modification. As a result, the one or more unaffected data tree nodes need not be recomputed. In the case of page state self-sufficiency, the new page data tree $d_2$ can be computed as a function of the page data tree $d_1$ and the modification log, without access to the database tables. Since the PSC stores the modification log and the page data tree $d_1$ in main memory, fast computation can be achieved, e.g. by avoiding disk access. Furthermore, as online analytical processing (OLAP) and view maintenance literature has shown, self-sufficiency opportunities can be greatly increased by the inclusion of a small amount of additional data in a view. For example, an average view is not self-maintainable if it only has average values, but is self-maintainable if the counts also are included.

In the case of incremental maintenance, when the previous two cases are not available, the PSC may need to access one or more database tables to compute the value $\text{Diff}_{d2-d1}$ and consequently $d_2$. However, computing $\text{Diff}_{d2-d1}$ is usually faster than running the page query from scratch, with the help of modification log and the cached old page data set.

The PSC also can utilize any combination of the opportunities to maintain a page data tree, and can apply techniques corresponding to different opportunities to different parts of the page. In one example, the current reviewer can update the grade and the comment of a review, e.g. review #2, associated with a proposal 509 1105. As a result, the modification log can include (a) an update to the comment and rating of the tuple (509, #2) in the reviews table 1110, and (b) an update of the mode value of the tuple (509, #2) in the draft_review table.

The modification log also can have changes entered by other users before the submission by the current reviewer. For example, the modification log can include (c) an insertion of new review #3 for proposal 509 1105, (d) an update of a review of another proposal 456, and (e) an insertion of a recommendation on yet another page of the exemplary web application, called the Recommend Proposals page, whereas a National Science Foundation director decides which proposals to recommend. If the displayed page does not show recommendations, the PSC can determine during compilation time, given the modification log, that the change (e) does not affect the review page (i.e., the non-modification case). Also, if the page does not include proposal 456, the PSC also can determine that change (d) does not affect the page. The other changes in the modification log can correspond to either the page state self-sufficiency case or the incremental maintenance case. In particular, because of updates (a) and (b), the input tuple (form) at proposal 509 1105 will disappear since the switch node will revert to the display case, and the display tuple at proposal 509 1105 will be set according to the grade and review submitted by current reviewer. Further, a new review tuple 1115 is inserted into the list of other reviews in response to the insertion (c). Additionally, in response to update (a) and insertion (c), the average can be incrementally recomputed from the old average, the count (if included in the view as additional data), and the modifications.

Implementation of incremental update on extended relational views

The relational model literature has described methods for efficiently maintaining a materialized SQL view V=q(R1, R2, ..., Rn), where q is a SQL query and {R1, R2, ..., Rn} are base tables. One approach implemented by prior work and also by PSC in FORWARD is to model data changes as differential tables. Let the old view instance be V1 and the new view instance be V2. Between V1 and V2, the differential tables for a base relation Ri are Δ+Ri containing tuples inserted into Ri, and Δ−Ri containing tuples deleted from Ri. Δ+Ri and Δ−Ri are captured in the modification log. In the same way Δ+Ri and Δ−Ri can be defined. Tuple update can be treated as a combination of insertion and deletion. The view maintenance algorithm RIVM in this approach runs two queries qΔ+ and qΔ− over {R1, R2, Rn, Δ+R1, Δ+Rn, Δ−R1, Δ−Rn} that produce Δ+V and Δ−V respectively. In one implementation, the RIVM 1018 incorporates prior work on SQL view maintenance in order to modify the old page data tree 1011 to the new page data tree 1020. In particular, the compilation time operation 1001 and the run time operation 1010 of FIG. 10 can incrementally maintain the page data tree by transforming the page schema 1002 into flat relational tables, e.g., 1004, 1006, 1008, etc. with respective SQL queries 1005, 1007, 1009 populating these tables.

Transformation of Nested Schemas and Switch Schemas into Tables

The PSC, during compilation time 1001, transforms a nested page schema into flat relational schemas $T_1$ 1004, $T_2$ 1006, $T_3$ 1008, etc., and the corresponding page query into SQL queries $Q_1$ 1005, $Q_2$ 1007, $Q_3$ 1009, etc., such that each $T_i$ is populated by the respective $Q_i$.

Figure 12:
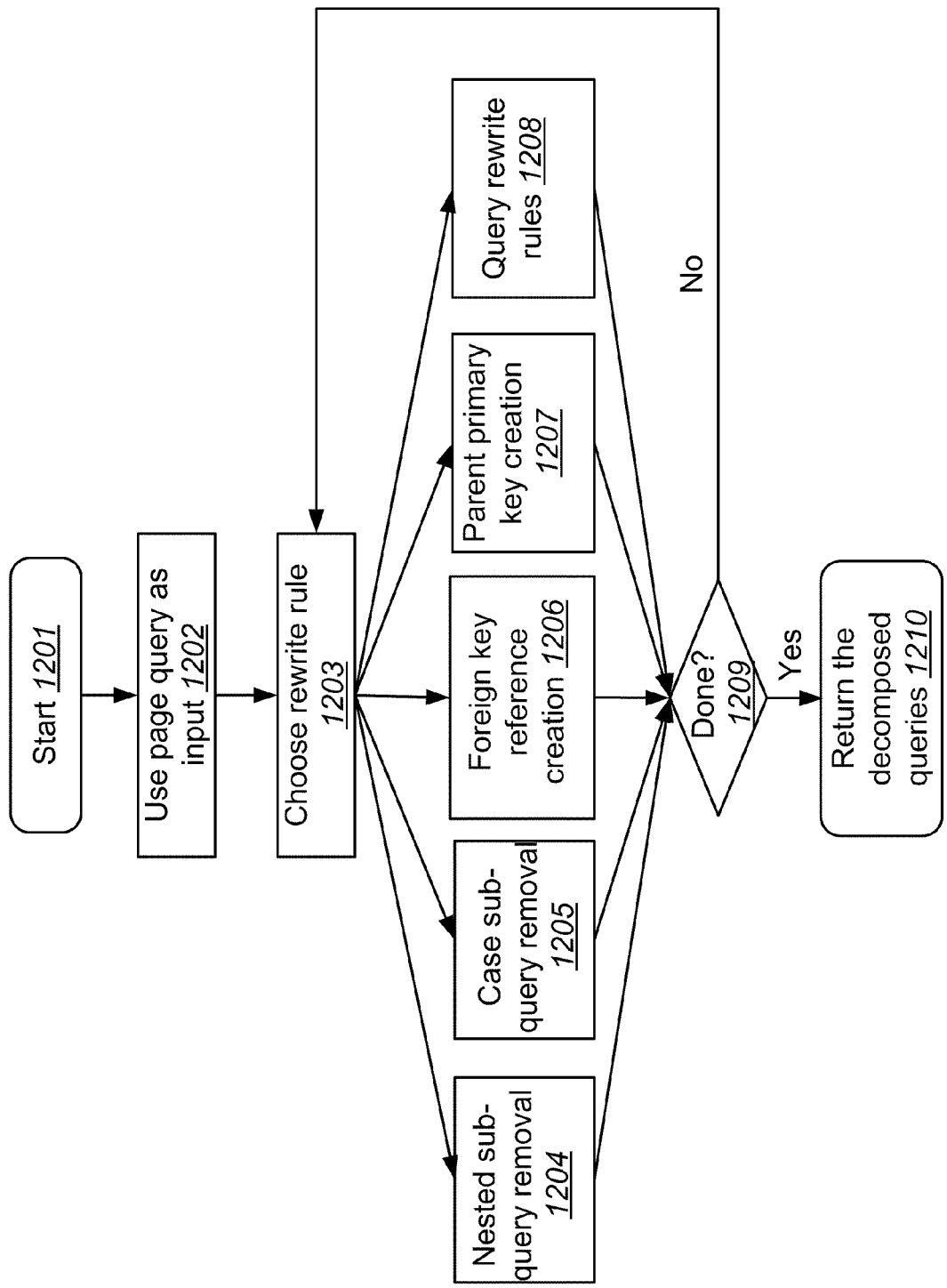
FIG. 12 shows an exemplary process flow for transforming a page query into decomposed SQL queries.

Given a page query q 1003 and corresponding page schema V 1002, PSC takes the first step to create flat relations $S_1, \ldots, S_n$ as follows to represent the decomposition of V with respect to q. In conjunction with creating the flat relations, PSC also decomposes the page query into separate SQL queries, as illustrated in the exemplary algorithm of steps 1201 to 1210 in FIG. 12. The outer-most collection of V is represented as the relation $S_1$. In Step 1203, one rewrite rule is chosen from a system of rewrite rules to transform the query. In Step 1204, each sub-query in the SELECT clause is transformed, such that the sub-query's output is mapped to a new relation. In Step 1205, each case sub-query in CASE WHEN conditional statements is also transformed, such that the sub-query's output is also mapped to a new relation. Notice that sub-queries in the WHERE clauses are unaffected. Let the corresponding sub-query for each $S_i$ be $p_i$. In Step 1206, if $p_a$ is the parent (sub-)query of $p_b$, then $S_b$ is expanded to contain the foreign key attributes referencing tuples in Sa, and Sa is called the parent of $S_b$. In Step 1207, the query is transformed such that the primary key attributes of each $S_i$ are made to include the foreign key attributes to its parent relation, if it exists, in addition to the $S_i$'s original primary key attributes.

In Step 1208, query rewrite rules are fired. For example, each flat relation $S_i$ after decomposition corresponds to a sub-query $p_i$ that may use values from its ancestor sub-queries. PSC modifies each $S_i$ to also input the flat view $T_i$ and creates its defining query $q_i$ based on $p_i$, so that each $q_i$ is a standalone SQL query. First, each $T_i$ is designed to have $S_i$'s schema and also to contain the attributes whose values are referred by any $p_k$ that is a descendant of $p_i$. Then the defining query $q_i$ of each flat view $T_i$ is modified from $p_i$ by adding $T_j$, where $p_j$ is the parent of $p_i$, as an additional input table in pi's WHERE clause. The original references to values in $p_j$ can then be changed in $q_i$ to the joined attributes from $T_j$. Finally, in order to ease the discussion, we still call that a flat relation $T_a$ is the parent of $T_b$ if $p_a$ is the parent of $p_b$. At Step 1210, after the query has been fully transformed by the rewrite rules, the decomposed SQL queries are returned.

During run time, PSC traverses $q_i$ from top down to incrementally maintain each $T_i$ as follows: First for the top level view $T_1$ defined by $q_1$, PSC runs $\Delta^+T_1$ and $\Delta^-T_1$ using RIVM. If $T_a$ is the parent of $T_b$, when $T_b$ is maintained by PSC, its parent table $T_a$ would have already been maintained, so that $\Delta^+T_a$ and $\Delta^-T_a$ are available, which is necessary since $T_a$ is an input relation to $T_b$'s definition $q_b$.

Transformation of Lists into Tables and Reordering

Since most prior work on relational view maintenance assume bag or set semantics only, PSC is extended to support ordered list semantics by embedding order information as data and simulating list-version operators using order-insensitive ones.

The support of list type in the data model of FORWARD allows list-version operators in the query language's algebra like the FLWR in XQuery where the inputs, outputs and intermediate results are treated as lists. Many of these operators only need to preserve the order of tuples from the input to the output, such as the list-version selection and projection. For the incremental view maintenance purpose, such operators can be simulated by their relational counterparts, with order information embedded as data inside the order specifying attributes. For example, a list can be encoded as a set of tuples {(1, tom), (2, ken), (3, jane)} with the auxiliary first attribute being the order specifying attribute. In one implementation, such system-generated attributes can use encodings like LexKey in order to support efficient repositioning. In this way, these operators can treat order like data and need not explicitly maintain it.

The ORDER BY operator that creates order is handled by PSC by marking during compilation time the order-by attributes as the order specifying attributes. At run time, only the inserted data changes are sorted, while the reordering of the entire view is deferred until the final result, where the size of data is usually small as limited by the nature of a web page.

Updating the Page Data Tree

After the data changes $\Delta^+T_i$ and $\Delta^-T_i$ are obtained for each $T_i$, the view maintenance result of the flat views are translated to $\text{Diffd}_2\text{-d}_1$ as a series of data modification commands and then applied to the old page data tree $d_1$ to obtain the new data tree $d_2$. The changes to different $T_i$ are applied in a top-down order, so that when changes to a child data node are applied, the parent data node is guaranteed to exist. Since every $T_i$ has primary key attributes defined to contain ancestors' primary keys in the corresponding data tree, it is simple to navigate in the data tree to locate the target of each change in $\Delta^+T_i$ and $\Delta^-T_i$. Notice that a relation in the data tree can be either a list or a set. If it is a list, tuples from $\Delta^+T_i$ need to be translated into list-version insert commands of the data tree which require adjacent tuples to be specified. Such adjacent tuples can be located efficiently by using binary-search over the order specifying attributes because the previous sorted list is materialized and cached as part of the data tree $d_1$. The handling of other cases is straightforward.

In one implementation, PSC focuses on deferred view maintenance that works with after-modification unified application state tables and the modification log. The benefit of this implementation is that in data-driven web applications, although a data modification can affect data trees seen by multiple users, the page view maintenance can be deferred until the user requests for the page again, so that the system throughput can be maximized.

Incremental Maintenance of The Visual Layer

Figure 13:
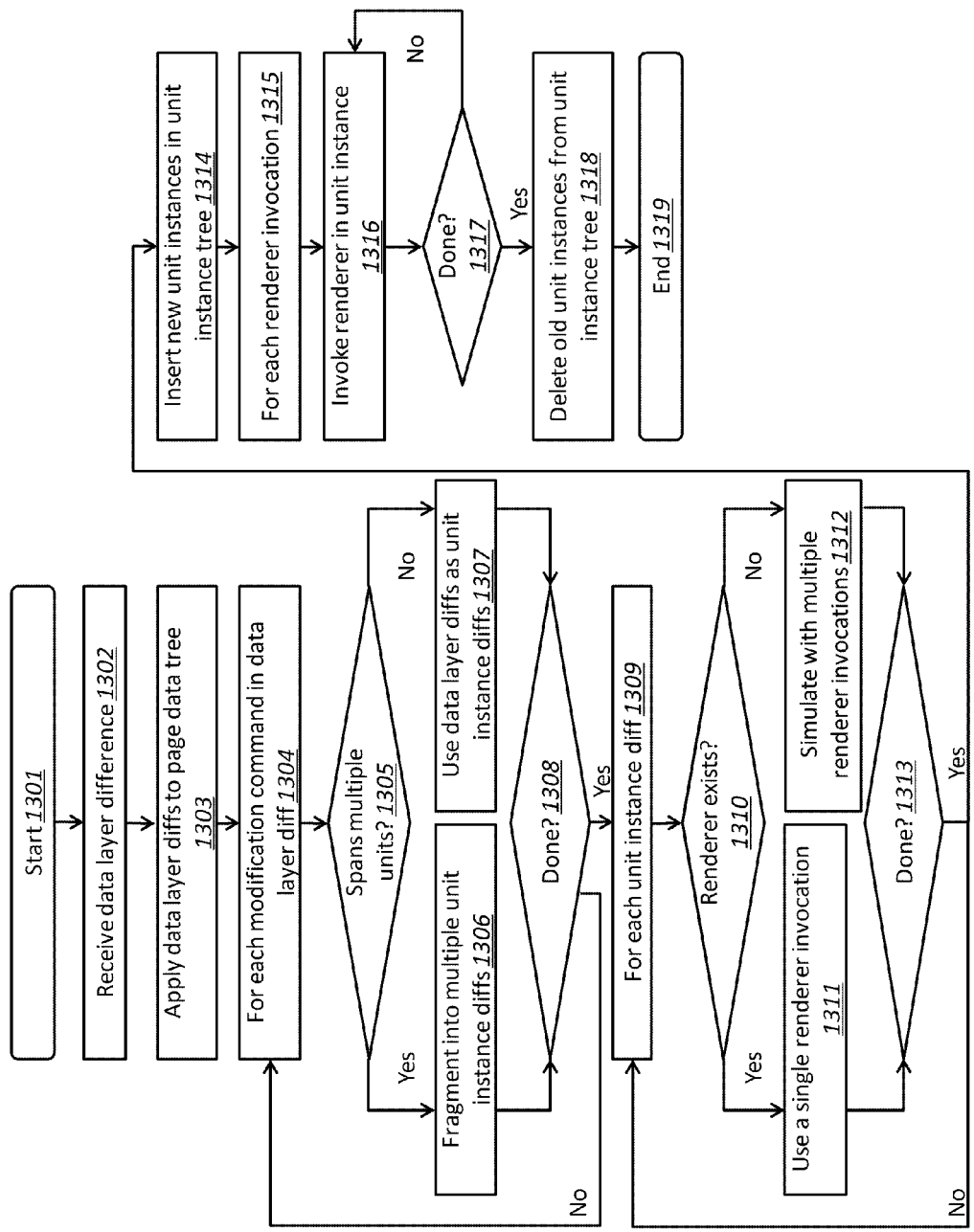
FIG. 13 shows an exemplary process flow for incremental rendering of a web application.

A visual layer, e.g. the visual layer 404, receives the data difference $\text{Diff}_{d2\text{-}d1}$ 1019 produced from the PSC, e.g. PSC 415, and refreshes the page through unit instances that translate the data layer difference into updates of DOM elements and JavaScript components 403. In one implementation, the visual layer implements partial update of the page by exploiting the observation that the browser page state can be divided into fragments, where each fragment corresponds to the rendering of a unit instance, which in turn inputs data from one or more corresponding data tree nodes. Therefore, only a unit instance corresponding to an updated data tree node needs to be re-rendered. The details of this implementation are provided in FIG. 13 and explained next.

Incremental Maintenance of Unit Instance Tree

Incremental maintenance of the page is facilitated by the unit instance tree, which, in one implementation, is a data structure residing on the browser. Each unit instance maintains pointers to its underlying DOM elements and JavaScript components, so that only pertinent elements/components are re-rendered. In Step 1302 of FIG. 13, the visual layer receives the data difference 1019 from the PSC 415. The data difference 1019 is encoded as a sequence of insert, update, and delete modification commands on the page data tree 414. In one implementation, the PSC has already applied such commands on the page data tree 414, therefore in step 1303 such changes are also applied to a minor copy of the page data tree in the browser. In the next steps the visual layer uses the unit tree 405 and the data difference 1019 to produce unit instance differences, which are corresponding insert, update, and delete encodings describing how to change each unit instance. In particular, in step 1304 the visual layer iterates over each modification command in 1319. Steps 1305 and 1306 dictate that each insert command that spans multiple units will be fragmented into insert commands for the respective unit instances; similarly so for each delete command. Each update command that spans multiple units will be fragmented into an update command for the top unit instance, delete commands for existing descendant unit instances, and insert command for new descendant unit instances. Furthermore, an insert command on the root attribute of a child unit instance will also need to be further fragmented into a pair of insert commands on the parent unit instance and child unit instance respectively, the former being necessary for the parent unit instance to determine where to place the component of the child unit instance. If the commands do not span multiple units, then step 1307 will cause the data layer difference to be used directly as a unit layer difference. When initializing a new page instance, the visual layer will create the unit instance tree from scratch. However, given an existing page instance, the visual layer will use the unit instance differences to incrementally maintain the unit instance tree, in order to preserve existing DOM elements and JavaScript components.

Mediating between Unit Differences and Javascript Components

In one implementation, the visual layer can proceed to determine in steps 1309 to 1313 how many renderer invocations are required to render each unit instance difference. Consider the number of possible combinations for a unit instance difference: (1) any of the unit schema's attributes can be the root of the data diff, and (2) the data diff can be encoded as any of the three insert, update and delete commands. For each (attribute, command) pair, a unit can be associated with a renderer. Since visual units typically utilize components from existing JavaScript libraries, the number of possible renderers exceeds that of available refresh methods on components. Therefore, given a unit difference, the framework considers in step 1310 whether the specific renderer for the (attribute, command) pair is implemented. If so, a single invocation of that renderer is used to render the unit instance difference as in step 1311. Otherwise, the framework will attempt to simulate it on a best-effort basis with other available renderers as in step 1312. For example, any renderer can be simulated by an update renderer of an ancestor attribute, while an update renderer on a tuple can also be simulated by a combination of insert and delete renderers on the same tuple. Minimally, a unit needs to be associated with an insert and delete renderer on the unit schema root attribute.

For example, consider the bar chart unit used on the Review Proposals page and a reviewer modifying his grade on a review. If the underlying JavaScript component supports changing the value of a particular bar, and a update renderer has been implemented for the value attribute, the bar chart will be incrementally refreshed where only the affected bar grows/shrinks. Otherwise, the entire bar chart has to be refreshed. Implementing specific renderers improves performance for units that are expensive to initialize (e.g. a map unit), and avoids overwriting user-provided values in units that collect values (e.g. a textbox).

Incremental Rendering of Units

After the necessary renderer invocations have been determined, the unit instance tree needs to be updated with new unit instances that correspond to insert commands on the root attribute of the unit instance, as in step 1314. This is necessary so that there is a unit instance on the unit instance tree for each renderer invocation to be fired. Once the unit instance tree is updated, the visual layer will invoke in turn, in steps 1315 to 1317 each unit instance's incremental renderer (or renderer) will be invoked, which will translate each unit instance difference into updates of the underlying DOM element or method calls of the underlying JavaScript component. Note that these renderers are implemented by unit authors, and are automatically utilized by the framework without any effort from the developer. Essentially, renderers modularize and encapsulate the partial update logic necessary to utilize JavaScript components, so that developers do not have to provide such custom logic for each page. Finally, in step 1318, after all renderers have been invoked, old unit instances that are no longer valid are deleted from the unit instance tree. These defunct unit instances correspond to delete commands on the root attribute of the unit instance.

Page Configuration

In one implementation, as exemplified in FIGS. 14A and 14B, a page configuration is an XHTML file with added:

First, markup specifications of units, which are specified as XML elements in the configuration and are rendered as maps, calendars, tabbed windows and other JavaScript-based components. Internally units can use components from Yahoo UI, Google Visualization and other libraries and wrap them so that they can participate in page configurations without any JavaScript code required from the developer. In the exemplary page configuration of FIGS. 14A and 14B a "bar chart" unit is specified by the markup of lines 1438-1446 and leads to a bar chart visualization as the one of FIG. 11.

Second, SQL-based inlined expressions and for and switch statements, which are responsible for dynamic data generation.

An fstmt:for statement evaluates its query and for each tuple in the result (conceptually) outputs an instance of its body configuration, that is the XHTML within the opening and closing fstmt:for tags. In the exemplary page configuration of FIGS. 14A and 14B the fstmt:for starting at line 1412 evaluates the query of lines 1413-1415, which returns "proposal" tuples. For each "proposal" tuple it outputs an instance of its body configuration, which starts on line 1416. Data from multiple data sources of the unified application state can be read from the fstmt:for with a single SQL++ query. For example, consider the queries on lines 1424 and 1453 that combine the session.user with the table reviews of the persistent schema db to produce the reviews of the currently logged-in user in just three lines of SQL.

Attributes of the results of the queries can be used in the body of the fstmt:for via expressions. In one implementation, the expressions can be syntactically denoted by curly braces { }. In the exemplary page configuration of FIG. 14A the expression of line 1418 outputs the proposal title.

The syntax and semantics of the fstmt:for and fstmt:switch statements are deliberately similar to the forEach and choose core tags of the popular JSP Standard Tag Library (JSTL). The same applies for expressions and JSTL expressions. However, FORWARD's fstmt:for iterates directly over a query, which in turn provides data of the unified application state, whereas JSTL's forEach iterates over vectors generated by a Java layer via imperative Java code. Besides the obvious code reduction resulting from removing the Java imperative code, we will see many more important benefits that are delivered because FORWARD analyzes the queries behind the dynamic data of the page.

The page configurations can enable nested, correlated structures on the pages. In particular, the query of an fstmt:for statement found within the body configuration of an enclosing fstmt:for may use attributes from the output of the query of the enclosing fstmt:for. In the exemplary page configuration of FIG. 14A, the table reviews is assumed to have a foreign key proposal. For each "proposal" instance the correlated query on line 1424 produces review tuples by using the proposal_id attribute of its enclosing query. Furthermore, the page configurations allow variability (e.g., the current user's review appears either in edit mode or in display mode) utilizing the fstmt:switch statement (line 1450 of FIG. 14B).

In one implementation, the framework can coerce the types produced by the expressions to the types required by the FORWARD units or XHTML, depending on where the expression appears. Therefore, the developer need not worry about fine discrepancies between the types used in the unified application state (which are dictated by the business logic and are often constrained) and the types used for rendering, which are often as general as they can be.

Conceptually, the page configuration is evaluated after every action execution. While such an explanation is simple to understand, it is only conceptual. As explained above, if the page that is displayed on the browser window before and after a action's execution is the same, then the implementation can incrementally update only the parts of the page that changed, therefore achieving the user-friendliness and efficient performance of Ajax pages, where the page does not leave the user's screen (and therefore avoids the annoying blanking out while waiting for the page to reload) but rather incrementally re-renders in response to changes.

Core Page Data Source as a Mirror of User Interface Controls

The core page source 314 captures a subset of page data. In one implementation, it captures the subset of page data that have been named by the developer, using the special tag name, in the page configuration, as shown in the exemplary page configuration of FIGS. 14A and 14B lines 1412, 1469, 1470. In one implementation, the core page schema is inferred by compilation of the page configuration. In the running example, the core page schema, which happens to fall within standard SQL, is a table of the proposals that appear on the screen along with their reviews and grades. In particular, it is a table named proposals (due to the stmt:for on line 1412) with a string attribute named review (due to line 1469) and an integer attribute named grade (line 1470 in FIG. 14B). The table proposals also has the key attribute proposal_id so that one can associate the data collected by the multiple instances of the editor and the sliders with proposals. Mechanically, FORWARD infers this attribute to be the key of the query that feeds proposals using a straightforward key inference algorithm. Notice that such inference relies on the underlying db.proposals table having a known key, which is an unavoidable assumption of the running example, no matter what technologies one uses to implement it.

An important piece of data in the core page is information about which action was invoked. In the running example, user events on the page may invoke the action save_review (line 1479 in FIG. 14B), and therefore it is important to know upon invocation which one of the many instances of the save_review was invoked. There are as many instances as proposals on the page. In one implementation, this problem is solved by having the core page identify the proposal_id for the invoked save_review.

The core page data is automatically up-to-date when an action starts its execution. The name attribute convention is reminiscent of the HTML standard's convention to allow a name to be associated with each form element and consequently generate request parameters with the provided names. Drawing further the similarities to HTML's request parameters, the request objects can keep only the tuple of the core that corresponds to the invoked action.

The Action Configuration

Building an action configuration can be greatly simplified by SQL++ access to the unified application state. It is further simplified by the FORWARD mapping language. In principle, the service input data can be generated by a SQL++ query. In practice though, the developer rarely does so since the input data of services can be specified much easier using mappings.

Figure 15:
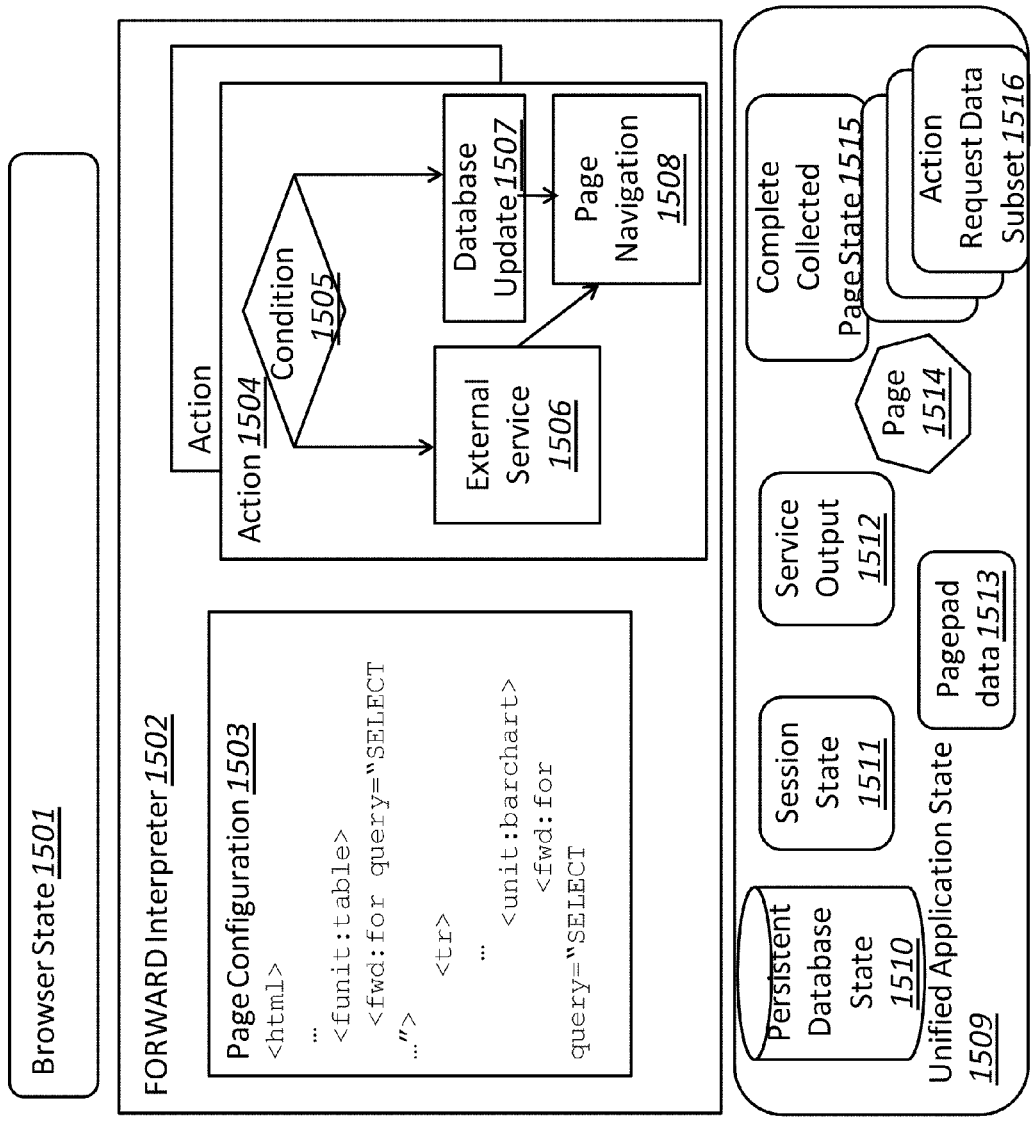
FIG. 15 shows an exemplary web application, including an exemplary page configuration, an exemplary action configuration, and an exemplary unified application state.

In one implementation, an action configuration is a composition of synchronous services in an acyclic structure with a single starting service, which is where the action's execution starts. For example, FIG. 15 shows the graphical representation of an action configuration, which is composing services 1506, 1507 and 1508, among others.

Figure 16:
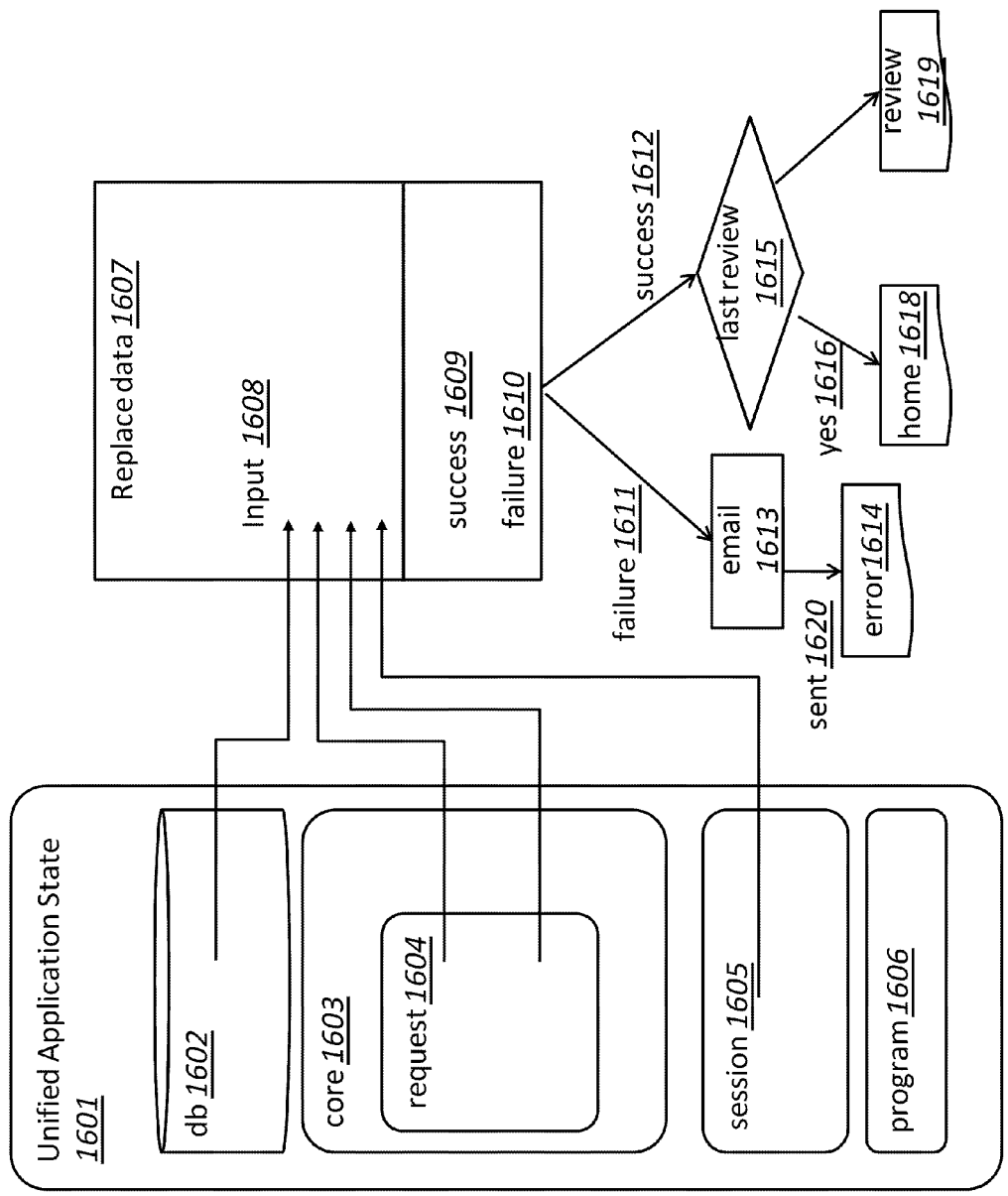
FIG. 16 shows an exemplary mapping from an exemplary unified application state into the input schema of an exemplary service.

Services input data from the unified application state. For example, FIG. 16 shows that a starting service replace_data 1607 takes as input data indicated by mappings from different parts of the unified application state 1601 (in this example, the persistent database state db 1602, the request data 1604 and the session data 1605) into the input schema of the service 1608. The invocation of a service has one or more possible outcomes, and each outcome (1) generates a corresponding service output, which becomes part of the unified application state 1601, and (2) leads to the invocation of a consequent service or the end of the action. For example, the replace_data service has a success outcome 1609 and a failure one 1610. The former adds the replaced_tuple to the unified application state and the latter adds a failure message in order to facilitate the invocation of the consequent email service, which will email the failure message to the application administrator. Note that for consequent services, the developer is also able to draw mappings from the action data generated by previous services invocations, since service output 1512 is also captured in the unified application state.

FORWARD offers a special service called page navigation 1508 that actions use to instruct the FORWARD interpreter of which page to display next.

The transactional semantics of services differentiate the ones that have side effects from the ones that do not. A service has side effects if it makes changes observable by the outside world, be it by updating the unified application state or by invoking an external service, such as sending an email or charging a credit card. The replace_data and email are examples of services having side effects and are graphically depicted by rectangles in 1504. A service with no side effects is depicted by a rhombus and merely chooses what service will be invoked next. For example, if the outcome of replace_data is success, then the action will invoke the last review service, which simply checks if the review just saved was the last one to be submitted, and hence does not have any side effects. If so, another page navigation service will set the next page to be the home page of the application. Otherwise, the next page will be the same as the current review page.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of two or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LED (light emitting diode) or LCD (liquid crystal display) monitor or touch screen, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    receiving a page configuration that specifies an association between a markup language and results of one or more read commands performed over a unified application state comprising two or more data sources of different types, wherein the unified application state translates each read command performed over the unified application state into one or more read commands each of which accesses a different type of underlying data source, wherein at least one of the data sources comprises a database and at least one of the data sources that includes values corresponding to user interface controls on a page instance;
    computing, in response to one or more detected events, a result of the one or more read commands performed over the unified application state; and
    rendering the computed result on a client display, wherein the rendering is performed with reference to the specified association.

2. The computer-implemented method of claim 1, wherein at least one of the one or more read commands performed over the unified application state comprises a declarative query that specifies a result of the corresponding read command without specifying a control flow or an algorithm by which to compute the result.

3. The computer-implemented method of claim 1, wherein computing a result of the one or more read commands performed over the unified application state further comprises computing the result by partial update of the page instance.

4. The computer-implemented method of claim 1, wherein:
    the page configuration specifies one or more visual units and associates one or more output attributes of at least one of the one or more read commands performed over the unified application state with an attribute of the one or more visual units; and
    the computed result is rendered on the client display by the one or more visual units.

5. The computer-implemented method of claim 1, wherein the computed result includes nesting.

6. The computer-implemented method of claim 1, wherein the computed result includes variability.

7. The computer-implemented method of claim 1, wherein the computed result includes ordering.

8. A non-transitory computer-readable storage medium having code stored thereupon, the code, when implemented, causing a processor to implement a method, comprising:
    storing a page configuration and a plurality of data sources stored on computer-readable media;
    receiving the page configuration that specifies an association between a markup language and results of one or more read commands performed over a unified application state comprising two or more data sources of different types, wherein the unified application state translates each read command performed over the Unified Application State into one or more read commands each of which accesses a different type of underlying data source, wherein at least one of the data sources comprises a database and at least one of the data sources that includes values corresponding to user interface controls on a page instance;
    computing a result corresponding to the one or more read commands to initialize a page instance;
    rendering the computed result on a client display;
    computing, in response to a detected event, a second result of the one or more read commands by partial update of the page instance, wherein the partial update is computed with reference to the specified association; and
    rendering the computed second result on the client display.

9. The non-transitory computer-readable storage medium of claim 8, wherein at least one of the one or more read commands performed over the unified application state comprises a declarative query that specifies a result of the corresponding read command without specifying a control flow or an algorithm by which to compute the result.

10. The non-transitory computer-readable storage medium of claim 8, wherein: the page configuration further specifies a visual unit and associates one or more output attributes of the one or more read commands performed over the unified application state with one or more attributes of the visual unit; and the computed second result is rendered on the client by the visual unit.

11. The non-transitory computer-readable storage medium of claim 8, wherein at least one of the computed result and the computed second result includes nesting.

12. The non-transitory computer-readable storage medium of claim 8, wherein at least one of the computed result and the computed second result includes variability.

13. The non-transitory computer-readable storage medium of claim 8, wherein at least one of the computed result and the computed second result includes ordering.

14. A computer-implemented method comprising:
receiving a page configuration that specifies an association between a markup language and results of one or more read commands performed over a unified application state comprising two or more data sources of different types, wherein the unified application state translates each read command in a first language performed over the unified application state into one or more read commands in different languages, each translated read command accessing a different type of underlying data source, wherein at least one of the data sources comprises a database and at least one of the data sources that includes values corresponding to user interface controls on a page instance; wherein the unified application state is a virtual database in which page data is reflected from a client display before the page data is used by the one or more read commands;

detecting one or more events indicating occurrence of an activity related to an event timer or user interface control;
computing, in response to the one or more detected events, a result of the one or more read commands performed over the unified application state; and
rendering the computed result on the client display, wherein the rendering is performed with reference to the specified association.

15. The computer-implemented method of claim 14, wherein at least one of the one or more read commands performed over the unified application state comprises a declarative query that specifies a result of the corresponding read command without specifying a control flow or an algorithm by which to compute the result.

16. The computer-implemented method of claim 14, wherein computing a result of the one or more read commands performed over the unified application state further comprises computing the result by partial update of the page instance.

17. The computer-implemented method of claim 14, wherein:
the page configuration specifies one or more visual units and associates one or more output attributes of at least one of the one or more read commands performed over the unified application state with an attribute of the one or more visual units; and
the computed result is rendered on the client display by the one or more visual units.

18. The computer-implemented method of claim 14, wherein the computed result includes nesting.

19. The computer-implemented method of claim 14, wherein the computed result includes variability.

20. The computer-implemented method of claim 14, wherein the computed result includes ordering.

* * * * *